United States Patent
Hahn et al.

(10) Patent No.: US 10,674,521 B2
(45) Date of Patent: Jun. 2, 2020

(54) METHOD AND APPARATUS FOR TRANSMITTING AND RECEIVING DATA IN WIRELESS COMMUNICATION SYSTEM

(71) Applicant: LG ELECTRONICS INC., Seoul (KR)

(72) Inventors: Genebeck Hahn, Seoul (KR); Heejeong Cho, Seoul (KR); Eunjong Lee, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 15/771,936

(22) PCT Filed: Jan. 27, 2016

(86) PCT No.: PCT/KR2016/000849
§ 371 (c)(1),
(2) Date: Apr. 27, 2018

(87) PCT Pub. No.: WO2017/073844
PCT Pub. Date: May 4, 2017

(65) Prior Publication Data
US 2018/0343659 A1 Nov. 29, 2018

Related U.S. Application Data

(60) Provisional application No. 62/248,322, filed on Oct. 30, 2015.

(51) Int. Cl.
*H04W 72/08* (2009.01)
*H04W 76/10* (2018.01)
(Continued)

(52) U.S. Cl.
CPC ......... *H04W 72/085* (2013.01); *H04W 36/00* (2013.01); *H04W 36/0088* (2013.01);
(Continued)

(58) Field of Classification Search
CPC ..... H04W 76/27; H04W 24/10; H04W 36/08; H04L 61/6022
See application file for complete search history.

(56) References Cited

U.S. PATENT DOCUMENTS 8,358,982 B2 * 1/2013 Van Der Velde ............. H04W 36/0088 455/425
2013/0170435 A1 * 7/2013 Dinan ................. H04L 45/50 370/328
(Continued)

FOREIGN PATENT DOCUMENTS

KR 10-2009-0078839 A 7/2009
KR 10-2015-0048618 A 5/2015

OTHER PUBLICATIONS

Intel Corporation, "Motivation for New SI: Measurement Gap Enhancement", RP-141873, 3GPP TSG RAN Meeting #66,. Maui, USA. Dec. 8-11, 2014.
(Continued)

*Primary Examiner* — Wei Zhao
(74) *Attorney, Agent, or Firm* — Birch, Stewart, Kolasch & Birch, LLP

(57) ABSTRACT

The present invention relates to a method and an apparatus for transmitting and receiving data in a wireless communication system. The present invention can provide a method comprising the steps of: receiving, from a terminal, fourth indication information indicating whether the terminal can provide a mission critical service (MCS); transmitting the fourth indication information to a network node; receiving, from the network node, first indication information indicat-
(Continued)

ing division of a measurement gap indicating a gap for performing measurement on a non-serving frequency; transmitting the first indication information to the terminal; and receiving MCS data in at least one divided measurement gap, during which no synchronization signal is detected, among the divided measurement gaps.

19 Claims, 31 Drawing Sheets

(51) Int. Cl.
*H04W 36/00* (2009.01)
*H04W 76/27* (2018.01)
*H04W 56/00* (2009.01)
*H04W 72/04* (2009.01)

(52) U.S. Cl.
CPC ..... *H04W 56/001* (2013.01); *H04W 72/0446* (2013.01); *H04W 76/10* (2018.02); *H04W 76/27* (2018.02)

(56) References Cited

U.S. PATENT DOCUMENTS

2014/0295870 A1 10/2014 Wendland et al.
2015/0373584 A1* 12/2015 Hong .................. H04W 28/08
370/329

OTHER PUBLICATIONS

Intel Corporation, "New SI Proposal: Measurement Gap Enhancement", RP-150276, 3GPP TSG RAN Meeting #67, Shanghai, China, Mar. 9-12, 2015.

* cited by examiner

Fig. 5
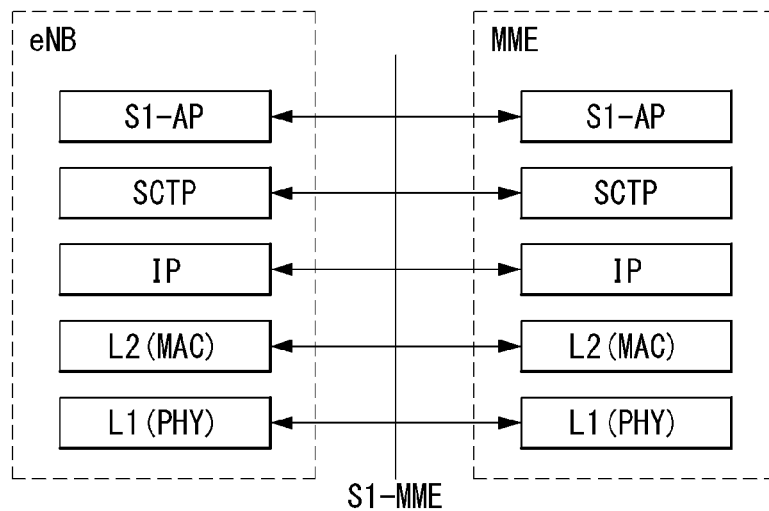
(a) control-plane protocol stack
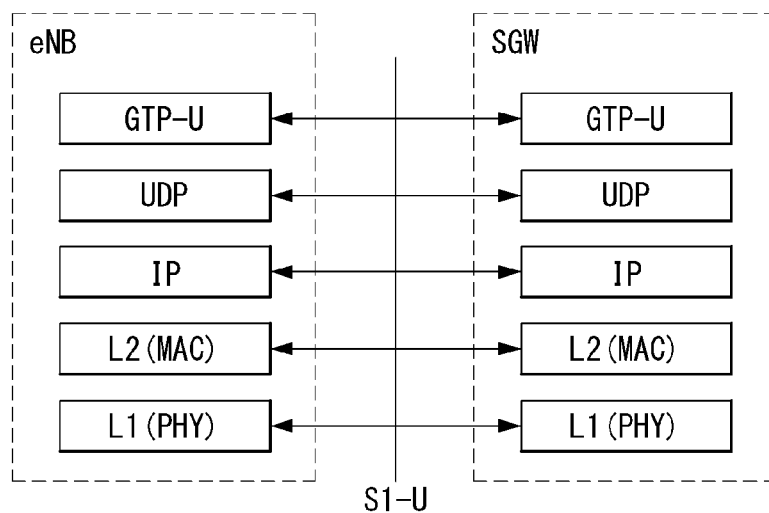
(b) user-plane protocol stack

Fig. 18

|     | Subframe |   |   |   |   |   |   |   |   |   |
|-----|---|---|---|---|---|---|---|---|---|---|
| SFN | 0 | 1 | 2 | 3 | 4 | 5 | 6 | 7 | 8 | 9 |
| 0   |   |   | G | G | G | G | G |   |   |   |
| 1   |   |   |   |   |   |   |   |   |   |   |
| 2   |   |   |   |   |   |   |   |   |   |   |
| 3   |   |   |   |   |   |   |   |   |   |   |
| 4   |   |   | G | G | G | G | G |   |   |   |
| 5   |   |   |   |   |   |   |   |   |   |   |
| 6   |   |   |   |   |   |   |   |   |   |   |
| 7   |   |   |   |   |   |   |   |   |   |   |
| 8   |   |   | G | G | G | G | G |   |   |   |
| 9   |   |   |   |   |   |   |   |   |   |   |
| 10  |   |   |   |   |   |   |   |   |   |   |
| 11  |   |   |   |   |   |   |   |   |   |   |
| 12  |   |   | G | G | G | G | G |   |   |   |
| 13  |   |   |   |   |   |   |   |   |   |   |
| 14  |   |   |   |   |   |   |   |   |   |   |
| 15  |   |   |   |   |   |   |   |   |   |   |
| 16  |   |   | G | G | G | G | G |   |   |   |
| 17  |   |   |   |   |   |   |   |   |   |   |
| 18  |   |   |   |   |   |   |   |   |   |   |
| 19  |   |   |   |   |   |   |   |   |   |   |
| 20  |   |   | G | G | G | G | G |   |   |   |
| 21  |   |   |   |   |   |   |   |   |   |   |
| 22  |   |   |   |   |   |   |   |   |   |   |
| 23  |   |   |   |   |   |   |   |   |   |   |
| 24  |   |   | G | G | G | G | G |   |   |   |
| 25  |   |   |   |   |   |   |   |   |   |   |
| 26  |   |   |   |   |   |   |   |   |   |   |
| 27  |   |   |   |   |   |   |   |   |   |   |

|     | Subframe |   |   |   |   |   |   |   |   |   |
|-----|---|---|---|---|---|---|---|---|---|---|
| SFN | 0 | 1 | 2 | 3 | 4 | 5 | 6 | 7 | 8 | 9 |
| 256 |   |   | G | G | G | G | G |   |   |   |
| 257 |   |   |   |   |   |   |   |   |   |   |
| 258 |   |   |   |   |   |   |   |   |   |   |
| 259 |   |   |   |   |   |   |   |   |   |   |
| 260 |   |   | G | G | G | G | G |   |   |   |
| 261 |   |   |   |   |   |   |   |   |   |   |
| 262 |   |   |   |   |   |   |   |   |   |   |
| 263 |   |   |   |   |   |   |   |   |   |   |
| 264 |   |   | G | G | G | G | G |   |   |   |
| 265 |   |   |   |   |   |   |   |   |   |   |
| 266 |   |   |   |   |   |   |   |   |   |   |
| 267 |   |   |   |   |   |   |   |   |   |   |
| 268 |   |   | G | G | G | G | G |   |   |   |
| 269 |   |   |   |   |   |   |   |   |   |   |
| 270 |   |   |   |   |   |   |   |   |   |   |
| 271 |   |   |   |   |   |   |   |   |   |   |
| 272 |   |   | G | G | G | G | G |   |   |   |
| 273 |   |   |   |   |   |   |   |   |   |   |
| 274 |   |   |   |   |   |   |   |   |   |   |
| 275 |   |   |   |   |   |   |   |   |   |   |
| 276 |   |   | G | G | G | G | G |   |   |   |
| 277 |   |   |   |   |   |   |   |   |   |   |
| 278 |   |   |   |   |   |   |   |   |   |   |
| 279 |   |   |   |   |   |   |   |   |   |   |
| 280 |   |   | G | G | G | G | G |   |   |   |
| 281 |   |   |   |   |   |   |   |   |   |   |
| 282 |   |   |   |   |   |   |   |   |   |   |
| 283 |   |   |   |   |   |   |   |   |   |   |

Fig. 22

```
           Subframe                    Subframe
      0 1 2 3 4 5 6 7 8 9         0 1 2 3 4 5 6 7 8 9
     |   |G|G|G|G|   |   |       |   |   |G|G|G|   |   |   |
     |   |   |   |G|G|G|   |       |   |   |   |G|G|   |   |   |
                                 |   |   |   |   |G|G|G|   |
           (a)                             (b)
```

Fig. 26

| SFN | 0 | 1 | 2 | 3 | 4 | 5 | 6 | 7 | 8 | 9 |
|---|---|---|---|---|---|---|---|---|---|---|
| 0 | GAP | | G | G | G | G | | | | |
| 1 | - | | | | | G | G | G | | |
| 2 | - | | G | G | G | G | | | | |
| 3 | - | | | | | G | G | G | | |
| 4 | GAP | | G | G | G | G | | | | |
| 5 | - | | | | | G | G | G | | |
| 6 | - | | G | G | G | G | | | | |
| 7 | - | | | | | G | G | G | | |
| 8 | GAP | | G | G | G | G | | | | |
| 9 | - | | | | | G | G | G | | |
| 10 | - | | G | G | G | G | | | | |
| 11 | - | | | | | G | G | G | | |
| 12 | GAP | | G | G | G | G | | | | |
| 13 | - | | | | | G | G | G | | |
| 14 | - | | G | G | G | G | | | | |
| 15 | - | | | | | G | G | G | | |
| 16 | GAP | | G | G | G | G | | | | |
| 17 | - | | | | | G | G | G | | |
| 18 | - | | G | G | G | G | | | | |
| 19 | - | | | | | G | G | G | | |
| 20 | GAP | | G | G | G | G | | | | |
| 21 | - | | | | | G | G | G | | |
| 22 | - | | G | G | G | G | | | | |
| 23 | - | | | | | G | G | G | | |
| 24 | GAP | | G | G | G | G | | | | |
| 25 | - | | | | | G | G | G | | |
| 26 | - | | G | G | G | G | | | | |
| 27 | - | | | | | G | G | G | | |
| 28 | GAP | | G | G | G | G | | | | |
| 29 | - | | | | | G | G | G | | |
| 30 | - | | G | G | G | G | | | | |
| 31 | - | | | | | G | G | G | | |
| 32 | GAP | | G | G | G | G | | | | |
| 33 | - | | | | | G | G | G | | |
| 34 | - | | G | G | G | G | | | | |
| 35 | - | | | | | G | G | G | | |
| 36 | GAP | | G | G | G | G | | | | |
| 37 | - | | | | | G | G | G | | |
| 38 | - | | G | G | G | G | | | | |
| 39 | - | | | | | G | G | G | | |
| 40 | GAP | | G | G | G | G | | | | |
| 41 | - | | | | | G | G | G | | |
| 42 | - | | G | G | G | G | | | | |
| 43 | - | | | | | G | G | G | | |
| 44 | GAP | | G | G | G | G | | | | |
| 45 | - | | | | | G | G | G | | |
| 46 | - | | G | G | G | G | | | | |
| 47 | - | | | | | G | G | G | | |
| 48 | GAP | | G | G | G | G | | | | |
| 49 | - | | | | | G | G | G | | |
| 50 | - | | G | G | G | G | | | | |
| 51 | - | | | | | G | G | G | | |
| 52 | GAP | | G | G | G | G | | | | |
| 53 | - | | | | | G | G | G | | |
| 54 | - | | G | G | G | G | | | | |
| 55 | - | | | | | G | G | G | | |
| 56 | GAP | | G | G | G | G | | | | |
| 57 | - | | | | | G | G | G | | |
| 58 | - | | G | G | G | G | | | | |
| 59 | - | | | | | G | G | G | | |
| 60 | GAP | | G | G | G | G | | | | |
| 61 | - | | | | | G | G | G | | |
| 62 | - | | G | G | G | G | | | | |
| 63 | - | | | | | G | G | G | | |
| 64 | GAP | | G | G | G | G | | | | |
| 65 | - | | | | | G | G | G | | |
| 66 | - | | G | G | G | G | | | | |
| 67 | - | | | | | G | G | G | | |
| 68 | GAP | | G | G | G | G | | | | |
| 69 | - | | | | | G | G | G | | |
| 70 | - | | G | G | G | G | | | | |
| 71 | - | | | | | G | G | G | | |
| 72 | GAP | | G | G | G | G | | | | |
| 73 | - | | | | | G | G | G | | |
| 74 | - | | G | G | G | G | | | | |
| 75 | - | | | | | G | G | G | | |
| 76 | GAP | | G | G | G | G | | | | |
| 77 | - | | | | | G | G | G | | |
| 78 | - | | G | G | G | G | | | | |
| 79 | - | | | | | G | G | G | | |
| 80 | GAP | | G | G | G | G | | | | |
| 81 | - | | | | | G | G | G | | |
| 82 | - | | G | G | G | G | | | | |
| 83 | - | | | | | G | G | G | | |
| 84 | GAP | | G | G | G | G | | | | |
| 85 | - | | | | | G | G | G | | |
| 86 | - | | G | G | G | G | | | | |
| 87 | - | | | | | G | G | G | | |
| 88 | GAP | | G | G | G | G | | | | |
| 89 | - | | | | | G | G | G | | |
| 90 | - | | G | G | G | G | | | | |
| 91 | - | | | | | G | G | G | | |
| 92 | GAP | | G | G | G | G | | | | |
| 93 | - | | | | | G | G | G | | |
| 94 | - | | G | G | G | G | | | | |
| 95 | - | | | | | G | G | G | | |

Fig. 27

| SFN | \multicolumn{10}{c}{Subframe} | | | | | | | | | | | SFN | \multicolumn{10}{c}{Subframe} | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | | 0 | 1 | 2 | 3 | 4 | 5 | 6 | 7 | 8 | 9 |
| 0 | GAP | | G | G | G | G | | | | | 48 | GAP | | G | G | G | G | | | | |
| 1 | – | | | | | G | G | G | | | 49 | – | | | | | G | G | G | | |
| 2 | – | | | | | | | | | | 50 | – | | | | | | | | | |
| 3 | – | | | | | | | | | | 51 | – | | | | | | | | | |
| 4 | GAP | | G | G | G | G | | | | | 52 | GAP | | G | G | G | G | | | | |
| 5 | – | | | | | G | G | G | | | 53 | – | | | | | G | G | G | | |
| 6 | – | | | | | | | | | | 54 | – | | | | | | | | | |
| 7 | – | | | | | | | | | | 55 | – | | | | | | | | | |
| 8 | GAP | | G | G | G | G | | | | | 56 | GAP | | G | G | G | G | | | | |
| 9 | – | | | | | G | G | G | | | 57 | – | | | | | G | G | G | | |
| 10 | – | | | | | | | | | | 58 | – | | | | | | | | | |
| 11 | – | | | | | | | | | | 59 | – | | | | | | | | | |
| 12 | GAP | | G | G | G | G | | | | | 60 | GAP | | G | G | G | G | | | | |
| 13 | – | | | | | G | G | G | | | 61 | – | | | | | G | G | G | | |
| 14 | – | | | | | | | | | | 62 | – | | | | | | | | | |
| 15 | – | | | | | | | | | | 63 | – | | | | | | | | | |
| 16 | GAP | | G | G | G | G | | | | | 64 | GAP | | G | G | G | G | | | | |
| 17 | – | | | | | G | G | G | | | 65 | – | | | | | G | G | G | | |
| 18 | – | | | | | | | | | | 66 | – | | | | | | | | | |
| 19 | – | | | | | | | | | | 67 | – | | | | | | | | | |
| 20 | GAP | | G | G | G | G | | | | | 68 | GAP | | G | G | G | G | | | | |
| 21 | – | | | | | G | G | G | | | 69 | – | | | | | G | G | G | | |
| 22 | – | | | | | | | | | | 70 | – | | | | | | | | | |
| 23 | – | | | | | | | | | | 71 | – | | | | | | | | | |
| 24 | GAP | | G | G | G | G | | | | | 72 | GAP | | G | G | G | G | | | | |
| 25 | – | | | | | G | G | G | | | 73 | – | | | | | G | G | G | | |
| 26 | – | | | | | | | | | | 74 | – | | | | | | | | | |
| 27 | – | | | | | | | | | | 75 | – | | | | | | | | | |
| 28 | GAP | | G | G | G | G | | | | | 76 | GAP | | G | G | G | G | | | | |
| 29 | – | | | | | G | G | G | | | 77 | – | | | | | G | G | G | | |
| 30 | – | | | | | | | | | | 78 | – | | | | | | | | | |
| 31 | – | | | | | | | | | | 79 | – | | | | | | | | | |
| 32 | GAP | | G | G | G | G | | | | | 80 | GAP | | G | G | G | G | | | | |
| 33 | – | | | | | G | G | G | | | 81 | – | | | | | G | G | G | | |
| 34 | – | | | | | | | | | | 82 | – | | | | | | | | | |
| 35 | – | | | | | | | | | | 83 | – | | | | | | | | | |
| 36 | GAP | | G | G | G | G | | | | | 84 | GAP | | G | G | G | G | | | | |
| 37 | – | | | | | G | G | G | | | 85 | – | | | | | G | G | G | | |
| 38 | – | | | | | | | | | | 86 | – | | | | | | | | | |
| 39 | – | | | | | | | | | | 87 | – | | | | | | | | | |
| 40 | GAP | | G | G | G | G | | | | | 88 | GAP | | G | G | G | G | | | | |
| 41 | – | | | | | G | G | G | | | 89 | – | | | | | G | G | G | | |
| 42 | – | | | | | | | | | | 90 | – | | | | | | | | | |
| 43 | – | | | | | | | | | | 91 | – | | | | | | | | | |
| 44 | GAP | | G | G | G | G | | | | | 92 | GAP | | G | G | G | G | | | | |
| 45 | – | | | | | G | G | G | | | 93 | – | | | | | G | G | G | | |
| 46 | – | | | | | | | | | | 94 | – | | | | | | | | | |
| 47 | – | | | | | | | | | | 95 | – | | | | | | | | | |

METHOD AND APPARATUS FOR TRANSMITTING AND RECEIVING DATA IN WIRELESS COMMUNICATION SYSTEM

CROSS REFERENCE TO RELATED APPLICATIONS

This application is the National Phase of PCT International Application No. PCT/KR2016/000849, filed on Jan. 27, 2016, which claims priority under 35 U.S.C. 119(e) to U.S. Provisional Application No. 62/248,322, filed on Oct. 30, 2015, all of which are hereby expressly incorporated by reference into the present application.

TECHNICAL FIELD

The present invention relates to a method for transmitting and receiving data in a wireless communication system, and more particularly, to a method that can transmit and receive data in a shortened gap by shortening a predetermined measurement gap and an apparatus for supporting the same.

BACKGROUND ART

Mobile communication systems have been developed to provide voice services while guaranteeing user mobility. Such mobile communication systems have expanded their coverage from voice services through data services up to high-speed data services. However, as current mobile communication systems suffer resource shortages and users demand even higher-speed services, the development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as dual connectivity, massive Multiple Input Multiple Output (MIMO), in-band full duplex, non-orthogonal multiple access (NOMA), supporting super-wide band, and device networking, have been researched.

DISCLOSURE

Technical Problem

Currently, availability of a radio link in an LTE/LTE-A system depends entirely on a probability of providing network coverage, which is approximately 95%.

In addition, in regard to reliability of the radio link of the LTE/LTE-A system, it is assumed that block error rate (BER) $10^{-3}$ is applied to provide sufficient reliability by H-ARQ retransmission in the case of unicast data through a PDSCH without distinguishing a control plane (C-plane) and a user plane (U-plane).

Although currently, the LTE/LTE-A system is greatly activated and provides various services, connectivity that guarantees reliability to meet mission critical services (MCSs) cannot be continuously provided during all time gaps.

In this case, since the LTE/LTE-A system itself is designed to provide relatively good connectivity for most of the time, data rate almost close to '0' is provided in specific poor coverage where there is extreme interference or network resources are overloaded.

In the future, new MCSs that rely heavily on the availability/reliability of the radio link to meet high-level communication quality are expected to emerge and evolution of wireless technology to accommodate the new MCSs is needed.

Therefore, an object of the present specification is to provide a method for realizing 'Truly Reliable Communication' of 5G by avoiding 'Best Effort Mobile Broadband' of the LTE/LTE-A system currently.

That is, an object of the present specification is to provide a method for avoiding service interruption due to setting of a measurement gap in providing multiple connections to terminals that are provided with the MCSs in a future 5G mobile communication system.

That is, in the 5G mobile communication system, the multiple connections are established with a plurality of alternative base stations per terminal in order to provide a high-reliability service. However, when the same measurement gap is set and applied to a serving base station and the alternative base stations for each terminal, since a gap is generated, during which the terminal may not transmit uplink data or receive downlink data with respect to the serving base station and the alternative base stations in order to perform inter-frequency measurement, when there are MCS data which the terminal is to transmit and receive to the base station during the corresponding gap or when there are MCS data which the base station is to transmit and receive to the terminal, a problem occurs, in which interruption inevitably occurs for low-latency and high-reliability services.

Therefore, proposed is a method for transmitting and receiving the MCS data by performing measurement by shortening the existing measurement interval gap or dividing the existing measurement gap into a plurality of short measurement gaps in order to seamlessly provide the high-reliability service.

Methods proposed in the present specification are a method for realizing flexible radio link connection control for enhancing radio link quality satisfaction of the terminal for applications meeting a low-latency requirement of 1 ms or less and requiring high reliability (packet error rate $<10^{-6}$), in providing a remote control service or the like in a smart car safety service, medical service/industry/robot, and the like.

Searching and maintaining the alternative base station other than the radio link used by the terminal means supporting the terminal to continuously possess the radio links meeting minimum QoE requirements for the MCSs in a specific geographical area.

The technical objects of the present invention are not limited to the aforementioned technical objects, and other technical objects, which are not mentioned above, will be apparently appreciated by a person having ordinary skill in the art from the following description.

Technical Solution

The present invention provides a method for transmitting and receiving data by a base station in a wireless communication system, including: receiving, from a terminal, fourth indication information indicating whether the terminal can provide a mission critical service (MCS); transmitting the fourth indication information to a network node; receiving, from the network node, first indication information indicating division of a measurement gap indicating a gap for performing measurement on a non-serving frequency; transmitting the first indication information to the terminal; and receiving MCS data in at least one divided measurement gap, during which no synchronization signal is detected, among the divided measurement gaps.

Further, the method further includes receiving second indication information indicating that the synchronization signal is not detected in a specific gap among the divided measurement gaps.

In addition, the method further includes receiving second indication information indicating that the synchronization signal is detected in a specific gap among the divided measurement gaps.

Moreover, in the present invention, the third indication information further includes positional information indicating a position of the specific gap.

In addition, in the present invention, the measurement gap is divided into two or three gaps.

Further, when the measurement gap is divided into a first gap and a second gap, the first gap is constituted by four subframes and the second gap is constituted by three subframes of subsequent system frame numbers (SFNs) of the first gap.

In addition, when the measurement gap is divided into the first gap and the second gap, the first gap is constituted by four subframes and the second gap is constituted by four subframes of subsequent system frame numbers (SFNs) of the first gap.

Moreover, the method further includes transmitting to the terminal configuration information including at least one of positional information indicating the positions of the divided measurement gaps, interval information indicating an interval of the divided measurement gaps, or period information indicating a period of the divided measurement gaps.

In addition, the method further includes: transmitting a radio resource control (RRC) connection reconfiguration message to the terminal; and receiving an RRC connection reconfiguration complete message in response to the RRC connection reconfiguration message, and the RRC connection reconfiguration message includes at least one of the first indication information or the configuration information.

Further, in the present invention, the fourth indication information is included in an initial UE message and transmitted to the network node.

In addition, the method further includes: transmitting a request message for configuring an alternative link to at least one alternative base station; and receiving a response message including load status information indicating a load status of the at least one alternative base station from the at least one alternative base station, and in the alternative link, a signaling radio bearer (SRB) is in an inactive state.

Further, the method further includes: receiving an RRC connection request message from the terminal; transmitting an RRC connection setup message including at least one of an ID of the base station or a C-RNTI to the terminal; and receiving an RRC connection setup complete message in response to the RRC connection setup message, and the RRC connection request message includes at least of the fourth indication information, a cause field indicating the RRC connection request for the MCS, or list information of the at least one alternative base station.

In addition, the method further includes: transmitting an alternative link setup message to the at least one alternative base station; and receiving an alternative link setup complete message in response to the alternative link setup message, and the alternative link setup message includes at least one of a UE ID indicating the UE, context information of the UE, or fifth indication information indicating deactivation of the alternative link.

Further, the method further includes: receiving an initial context setup request message from the network node; and receiving an initial context setup response message in response to the initial context setup request message, and the initial context setup request message includes at least one of the first indication information, an E-RAB ID, an E-RAB, QoS, $K_{eNB}$, or a security algorithm.

In addition, the present invention provides a method for transmitting and receiving data by a base station in a wireless communication system, including: receiving an E-RAB configuration request message for requesting configuration of an E-UTRAN radio access bearer (E-RAB) for a mission critical service (MCS) from a network node, the E-RAB configuration request message including at least one of sixth indication information indication alternative link configuration between a terminal and at least one alternative base station or first indication information indicating division application of a measurement gap indicating a gap in which measurement for a non-serving frequency is performed from the network node; configuring an alternative link between the terminal and the at least one alternative base station based on the received E-RAB configuration request message; transmitting the first indication information to the terminal; and receiving MCS data in at least one divided measurement gap, during which no synchronization signal is detected, among the divided measurement gaps.

Further, the method further includes receiving second indication information indicating that the synchronization signal is not detected in a specific gap among the divided measurement gaps.

In addition, the method further includes receiving second indication information indicating that the synchronization signal is detected in a specific gap among the divided measurement gaps.

Moreover, in the present invention, the third indication information further includes positional information indicating a position of the specific gap.

Moreover, the method further includes transmitting to the terminal configuration information including at least one of positional information indicating the positions of the divided measurement gaps, interval information indicating an interval of the divided measurement gaps, or period information indicating a period of the divided measurement gaps.

Advantageous Effects

In the present specification, a method for transmitting and receiving data by a terminal, when data for providing MCS is generated, the generated data can be transmitted and received even in a predetermined measurement gap.

Further, in the present specification, a predetermined measurement gap is divided to transmit and receive MCS data in a gap other than a gap in which a synchronization signal is detected, thereby transmitting and receiving the data without interruption of service.

Further, in the present specification, the synchronization signal can be detected even when dividing the measurement gap by setting positions, intervals, and periods of the divided measurement gaps.

Effects which can be obtained in the present invention are not limited to the aforementioned effects and other unmentioned effects will be clearly understood by those skilled in the art from the following description.

DESCRIPTION OF DRAWINGS

FIG. 5 is a diagram illustrating a structure of an S1 interface protocol in the wireless communication system to which the present invention is applicable.

FIGS. 17 and 18 are diagrams illustrating an example of a method for performing measurement and setting of a measurement gap to which the present invention is applicable.

FIG. 22 is a diagram illustrating an example of the divided measurement gaps proposed by the present specification.

FIGS. 25 to 27 are diagrams illustrating an example of a method for setting divided measurement gaps and a set gap in the case of the multiple connections during the initial network connection proposed by the present specification.

MODE FOR INVENTION

Figure 1:
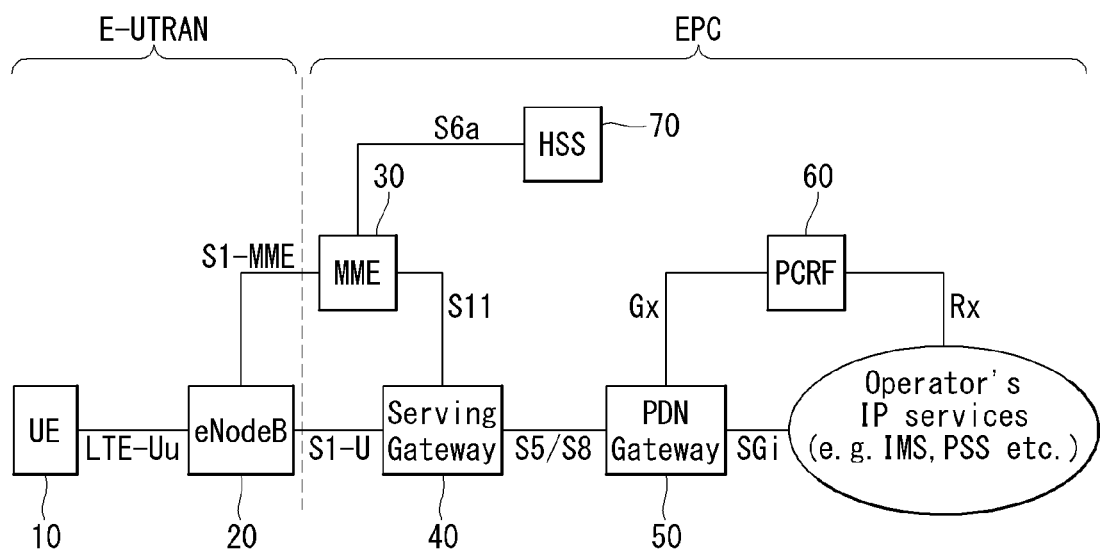
FIG. 1 is a view illustrating an Evolved Packet System which is associated with the Long Term Evolution (LTE) system to which the present invention may apply.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS)', 'access point (AP)', etc.

The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

Prior to going further to the description taken in conjunction with the drawings, the terms used herein are briefly defined for ease of understanding.

EPS: abbreviation of Evolved Packet System. Means a core network supporting a long term evolution (LTE) network. An evolved network of UMTS.

PDN (public data network): independent network where a servicing server is positioned.

APN (access point name): Name of an access point managed by a network, which is provided to UE. That is, the name of PDN (character string). Based on the name of the access point, a PDN for transmission/reception of data is determined.

TEID (tunnel endpoint identifier): End point ID of a tunnel configured between nodes in a network, configured per period on a per UE bearer basis.

MME: abbreviation of Mobility Management Entity. Functions to control each entity in the EPS to provide mobility and session for the UE.

Session: path for data transmission, and its unit may be PDN, bearer, or IP flow.

The differences between the units may be divided into an overall target network unit (APN or PDN unit), a unit separated with QoS therein (bearer unit), and a destination IP address unit as defined in 3GPP.

PDN connection: refers to connection from a terminal to PDN, i.e., correlation (connection) between a terminal represented in an IP address and PDN represented in APN. This means connection (terminal-PDN GW) between entities in the core network so that the session may be formed.

UE context: circumstance information of UE used to manage the UE in the network. That is, circumstance information consisting of UE id, mobility (e.g., current position), or attribute of session (QoS, priority, etc.).

FIG. 1 is a view illustrating an Evolved Packet System which is associated with the Long Term Evolution (LTE) system to which the present invention may apply.

The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE.

When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA).

Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

Figure 2:
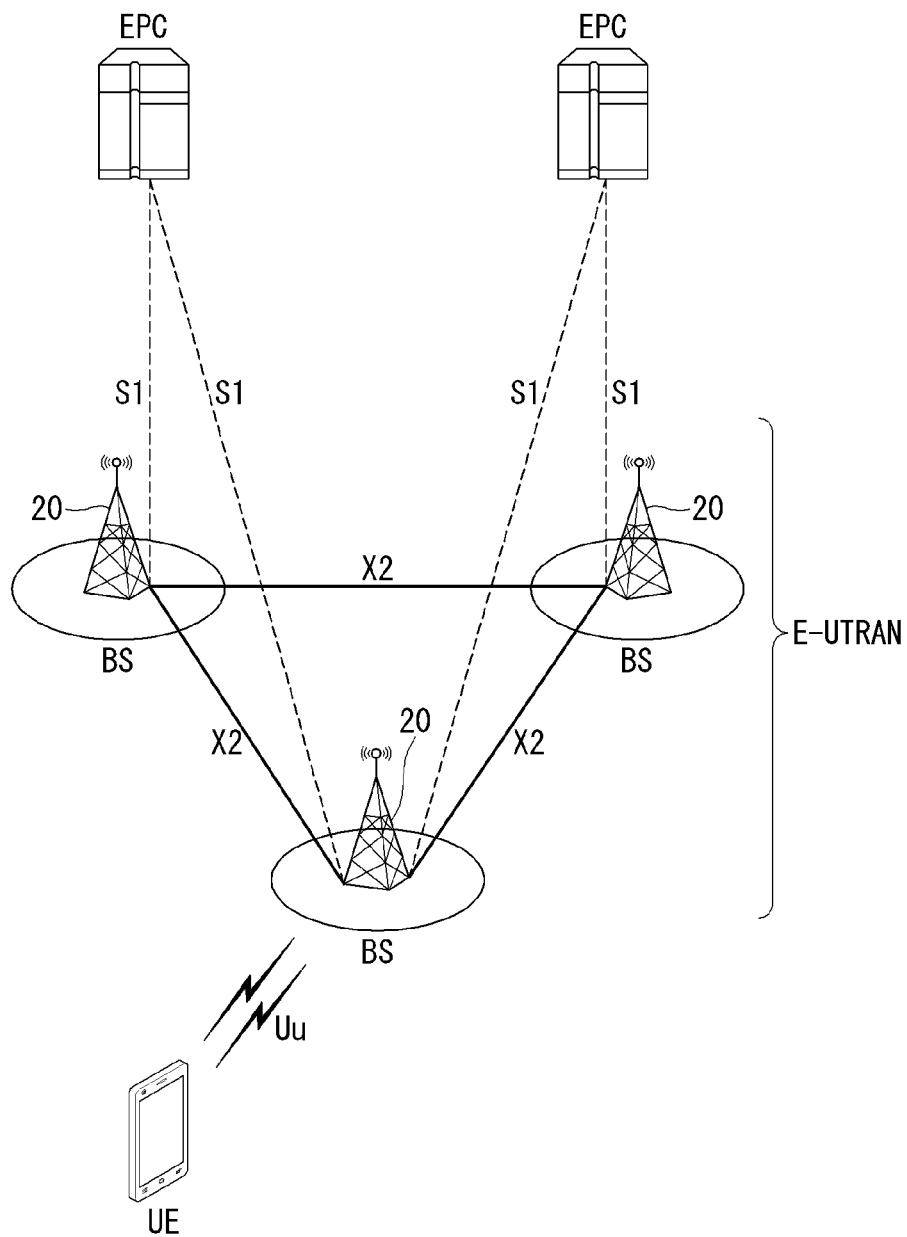
FIG. 2 illustrates a wireless communication system to which the present invention applies.

FIG. 2 illustrates a wireless communication system to which the present invention applies.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10.

The base stations 20 are interconnected by means of an X2 interface. The base stations 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the base station.

Figure 3:
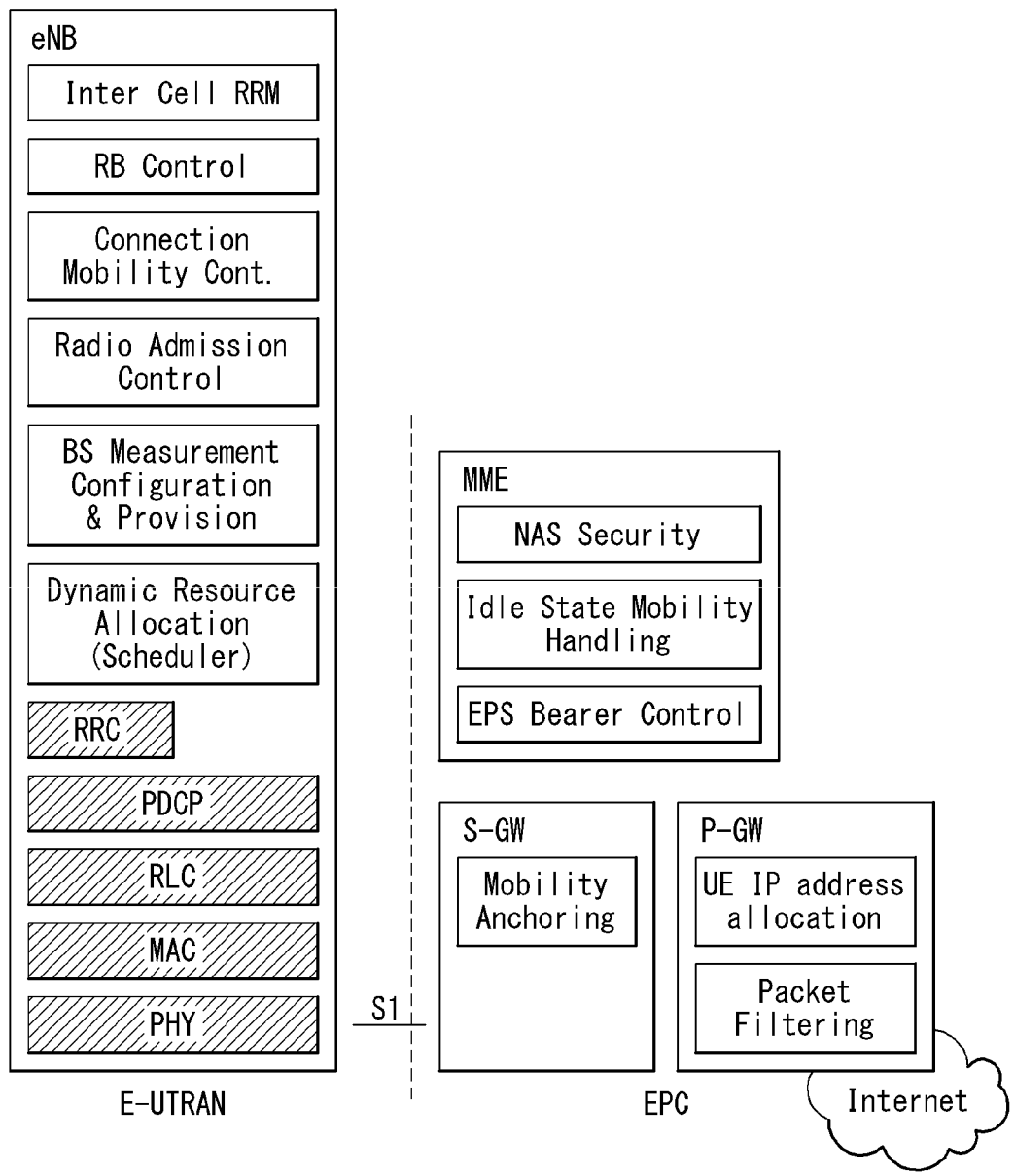
FIG. 3 illustrates a functional split of an E-UTRAN and an EPC to which the present invention may apply.

FIG. 3 illustrates a functional split of an E-UTRAN and an EPC to which the present invention may apply.

Referring to the FIG. 3, shaded blocks represent radio protocol layers, and empty blocks represent functional entities of the control plane.

The base station performs the following functions: (1) radio resource management (RRM) function such as radio bearer (RB) control, radio admission control, connection mobility control, dynamic resource allocation to the UE; (2) IP (Internet Protocol) header compression and decryption of user data stream; (3) routing of user plane data to a serving gateway (S-GW); (4) scheduling and transmission of a paging message; (5) scheduling and transmission of broadcast information; and (6) measurement for mobility and scheduling and establishing a measurement report.

An MME performs the following functions: (1) distribution of paging messages to base stations; (2) security control; (3) idle state mobility control; (4) S bearer control; (5) ciphering and integrity protection of NAS (Non-Access Stratum) signaling.

The S-GW performs the following functions: (1) termination of a user plane packet with respect to paging; and (2) user plane switching to support UE mobility.

Figure 4:
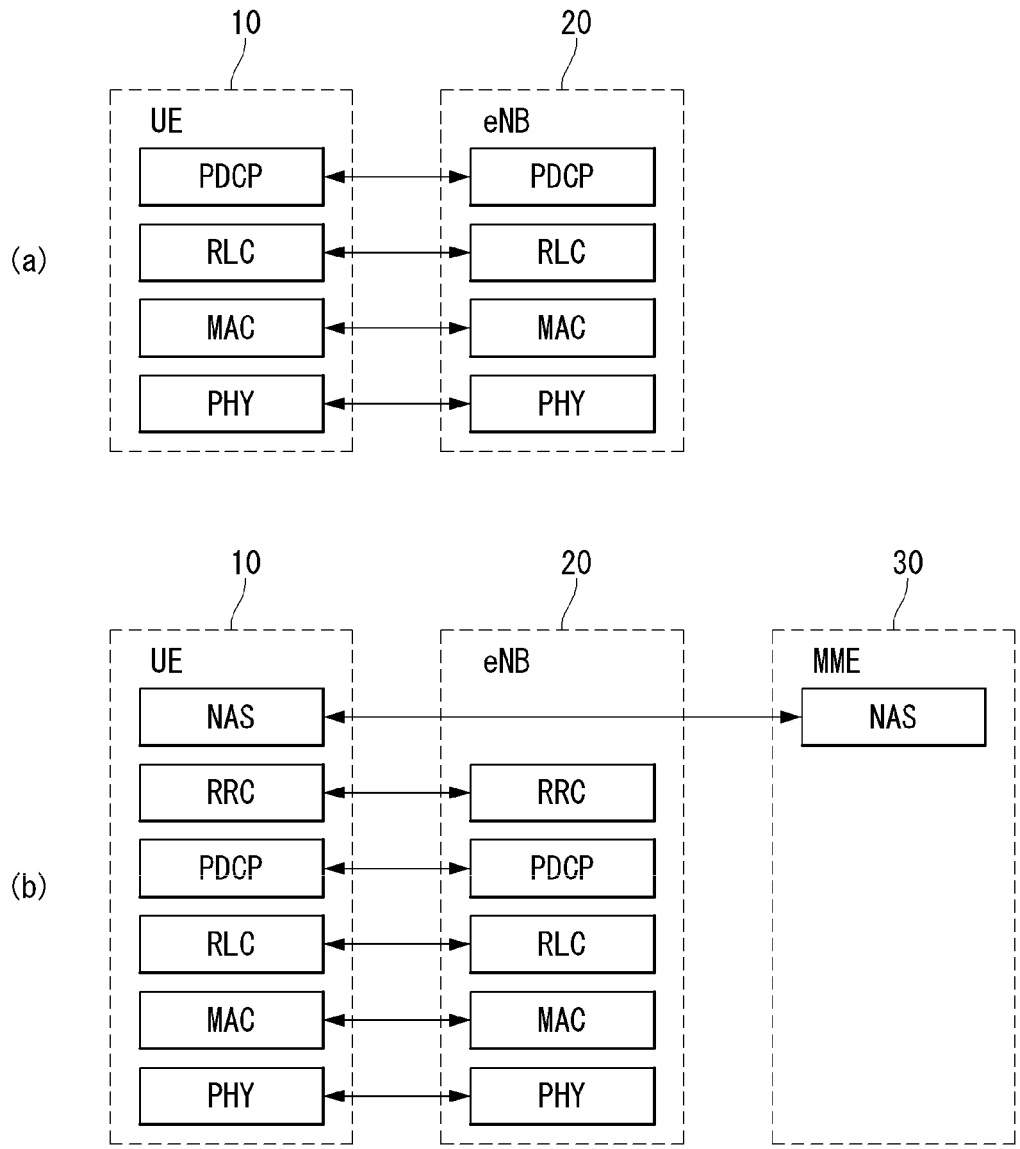
FIG. 4 is a diagram illustrating a radio protocol architecture to which technical features of the present specifications are applicable.

FIG. 4 is a diagram illustrating a radio protocol architecture to which technical features of the present specifications are applicable.

FIG. 4(*a*) illustrates an example of a radio protocol architecture for a user plane, and FIG. 4(*b*) illustrates an example of the radio protocol structure for a control plane.

The user plane is a protocol stack for transmitting user data and the control plane is a protocol stack for transmitting a control signal.

Referring to FIGS. 4(*a*) and 4(*b*), a physical layer (PHY) provides an information transfer service to an upper layer using a physical channel. The physical layer is connected to a medium access control (MAC) layer which is an upper layer through a transport channel. Data moves between the MAC layer and the physical layer through the transport channel. The transport channel is classified according to how the data is transmitted through a radio interface and what feature the data is transmitted.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Table 1 below shows an example of RNTI values used in the present invention.

TABLE 1

| Value (hexa-decimal) | RNTI |
| --- | --- |
| 0000 | N/A |
| 0001-003C | RA-RNTI, C-RNTI, Semi-Persistent Scheduling C-RNTI, Temporary C-RNTI, eIMTA-RNTI, TPC-PUCCH-RNTI, TPC-PUSCH-RNTI and SL-RNTI |
| 003D-FFF3 | C-RNTI, Semi-Persistent Scheduling C-RNTI, eIMTA-RNTI, Temporary C-RNTI, TPC-PUCCH-RNTI, TPC-PUSCH-RNTI and SL-RNTI |
| FFF4-FFFc | Reserved for future use |
| FFFD | M-RNTI |
| FFFE | P-RNTI |
| FFFF | SI-RNTI |

FIG. 5 illustrates an S1 interface protocol structure in a wireless communication system to which the present invention may apply.

(a) of FIG. 5 illustrates the control plane protocol stack in the S1 interface, and (b) of FIG. 5 illustrates the user plane interface protocol structure in the S1 interface.

With reference to FIG. 5, the S1 control plane interface (S1-MME) is defined between the eNB and the MME. The transport network layer is built on IP transport, similarly to the user plane, but for the reliable transport of signaling messages SCTP is added on top of IP. The application layer signaling protocol is referred to as S1-AP (S1 Application Protocol).

The SCTP layer provides guaranteed delivery of application layer messages.

The transport IP layer employs point-to-point transmission for Protocol Data Unit (PDU) signaling transmission.

For each S1-MME interface instance, a single SCTP association uses a pair of stream identifiers for the S1-MME common procedure.

Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure.

The MME communication context identifier and the eNB communication context identifier are used for identifying UE-specific S1-MME signaling transmission bearer. The communication context identifier is delivered within each S1-AP message.

If the S1 signaling transport layer notifies the S1AP layer of disconnection of signaling, the MME changes the state of the UE which has used the corresponding signaling connection to ECM-IDLE state. Furthermore, the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

EMM and ECM States

EPS Mobility Management (EMM) and EPS Connection Management (ECM) states will be described.

Figure 6:
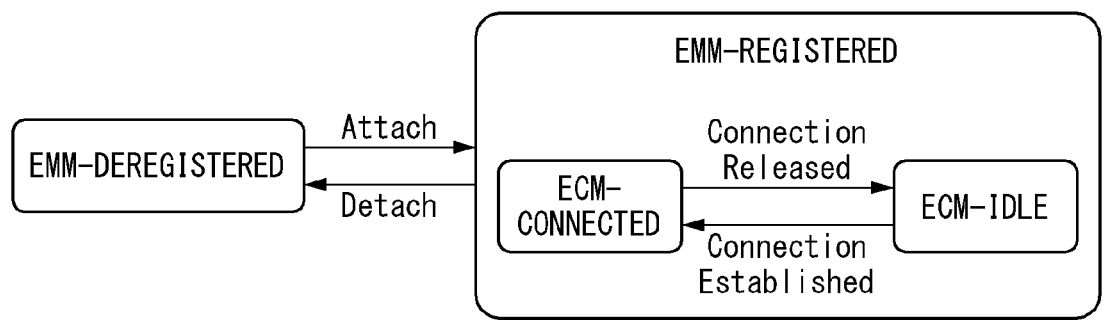
FIG. 6 is a diagram illustrating EMM and ECM states in a wireless communication system to which the present invention may apply.

FIG. 6 illustrates an EMM and ECM states in a wireless communication system to which the present invention may apply.

With reference to FIG. 6, to manage mobility of the UE in the NAS layer defined in the control planes of the UE and the MME, EMM-REGISTERED and EMM-DEREGISTERED states may be defined depending on whether the UE is attached to or detached from a network. The EMM-REGISTERED and the EMM-DEREGISTERED states may be applied to the UE and the MME.

Initially, the UE stays in the EMM-DEREGISTERED state when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

Likewise, to manage signaling connection between the UE and the network, ECM-CONNECTED and ECM-IDLE states may be defined. The ECM-CONNECTED and ECM-IDLE states may also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, if RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network may identify the UE staying in the ECM-CONNECTED state at the level of cell unit and may control the UE in an effective manner.

Meanwhile, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE may receive a broadcast of system information and paging information by monitoring a paging signal at a specific paging occasion for each piece of UE-specific paging DRX cycle.

When the UE is in the ECM-IDLE state, the network does not carry context information of the UE. Therefore, the UE staying in the ECM-IDLE state may perform a mobility-related procedure based on the UE, such as cell selection or cell reselection, without necessarily following an order of the network. If the position of the UE differs from the position recognized by the network while the UE is in the ECM-IDLE state, the UE may inform the network of the corresponding position of the UE through a Tracking Area Update (TAU) procedure.

Meanwhile, when the UE is in the ECM-CONNECTED state, mobility of the UE is managed by an order of the network. While the UE stays in the ECM-CONNECTED state, the network knows to which cell the UE currently belongs. Therefore, the network may transmit and/or receiver data to or from the UE, control mobility of the UE, such as handover, and perform cell measurement with respect to neighboring cells.

As described above, the UE has to make a transition to the ECM-CONNECTED state in order to receive a general mobile communication service, such as a voice or data communication service. When the UE is first powered on, the UE in its initial state stays in the ECM-IDLE state as in the EMM state, and if the UE successfully registers to the corresponding network through an initial attach procedure, the UE and the MME make a transition to the ECM connection state. Furthermore, if UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

Figure 7:
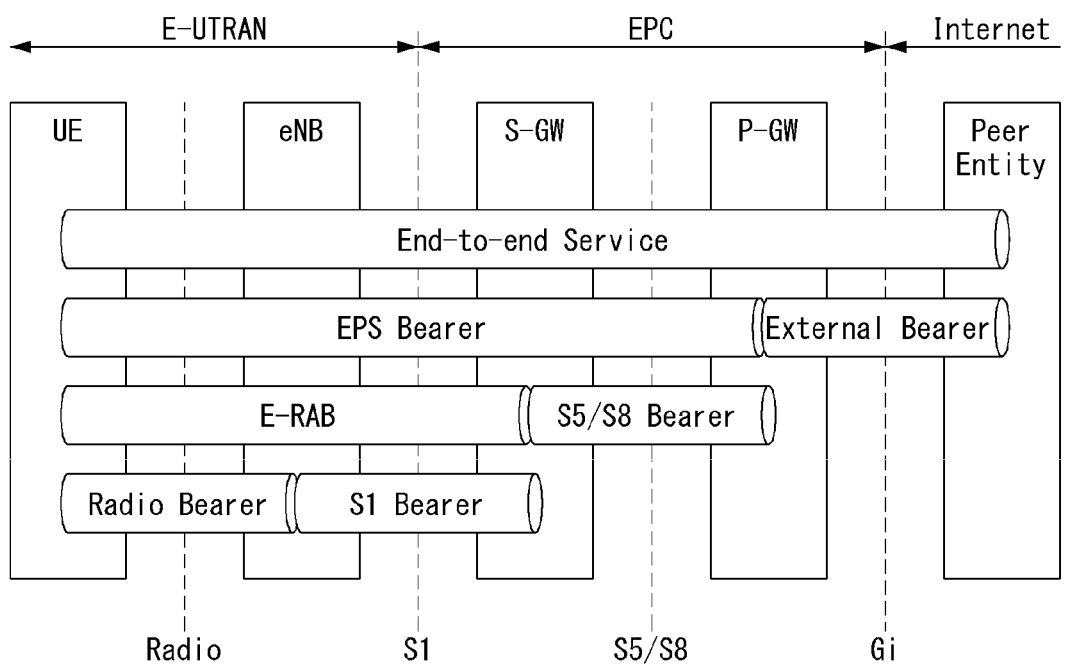
FIG. 7 is a diagram illustrating a bearer structure in a wireless communication system to which the present invention may apply.

FIG. 7 illustrates a bearer structure in a wireless communication system to which the present invention may apply.

When a UE is connected to a Packet Data Network (PDN) (which is the peer entity of FIG. 7), a PDN connection is established, which may also be called an EPS session. The PDN provides a service function such as the Internet or IP Multimedia Subsystem (IMS) through an external or internal IP network of a service provider.

An EPS session comprises one or more EPS bearers. The EPS bearer refers to the transmission path of traffic generated between the UE and the PDN GW for the EPS to deliver user traffic. One or more EPS bearers may be set up for each UE.

Each EPS bearer may be classified into E-UTRAN Radio Access Bearer (E-RAB) or S5/S8 bearer, and the E-RAB may be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. When an E-RAB is existed, the E-RAB bearer is one-to-one mapped to the EPS bearer. A Data Radio Bearer (DRB) delivers packets of the EPS bearer between the UE and the eNB. When a DRB is existed, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is an IP flow or a group of IP flows obtained by classifying (or filtering) user traffic according to an individual service. A plurality of SDFs may be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs may be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer may be one of two types: a default bearer and a dedicated bearer. The UE may have one default bearer and one or more dedicated bearers for each PDN. The minimum basic bearer that the EPS session may have with respect to one PDN is called the default bearer.

The EPS bearer may be classified on the basis of its identity. The EPS bearer identity is allocated by the UE or the MME. The dedicated bearer(s) is combined with the default bearer by a Linked EPS Bearer Identity (LBI).

When the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released.

And when new traffic is generated in the corresponding PDN, the E-RAB bearer is reconfigured to deliver traffic.

When the UE attempts to use a service of which the Quality of Service (QoS) (e.g., Video on Demand (VoD) service, etc.) may not be supported by the default bearer while using a service (e.g., the Internet) through the default bearer, a dedicated bearer is created when the UE demands the high QoS service. In the case there is no traffic from the UE, the dedicated bearer is released. The UE or the network may create a plurality of dedicated bearers depending on needs.

Depending on which service the UE uses, the IP flow may have different QoS characteristics. When the EPS session for the UE is established or modified, the network allocates network resources; or determines a control policy about QoS and applies the policy while the EPS session is maintained. The aforementioned operation is called the Policy and Charging Control (PCC). The PCC rule is determined based on the operator's policy (e.g., a QoS policy, gate status, charging method, etc.).

The PCC rule is determined in SDF unit. In other words, according to the service that the UE uses, the IP flow can have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules can be classified by dynamic PCC rules and pre-defined PCC rules. A dynamic PCC rule is provided dynamically from the PCRF to the P-GW when the EPS session is established or modified. On the other hand, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar can be pre-configured by one of integer values ranging from 1 to 9.

The main purpose of the ARP is to determine whether a request for an establishment or modification of a bearer can be accepted or needs to be rejected in case of resource limitations. Also, the ARP can be used by the eNB to determine which bearer(s) to drop during periods of exceptional limited resources (e.g., handover).

EPS bearers can be classified to Guaranteed Bit Rate (GBR)-type bearers and non-GBR type bearers depending on QCI resource type. A default bearer is always a non-GBR type bearer, but a dedicated bearer can be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, a non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers can be used together.

Once the QoS of the EPS bearer is determined, the QoS of each bearer is determined for each interface. Since the bearer of each interface provides QoS of the EPS bearer according to the interface, the EPS bearer, RB, and S1 bearer all have a one-to-one relationship among them.

When the UE, while using a service through the default bearer, uses a service that the default bearer alone is not enough to provide sufficient QoS, a dedicated bearer is generated on-demand.

Figure 8:
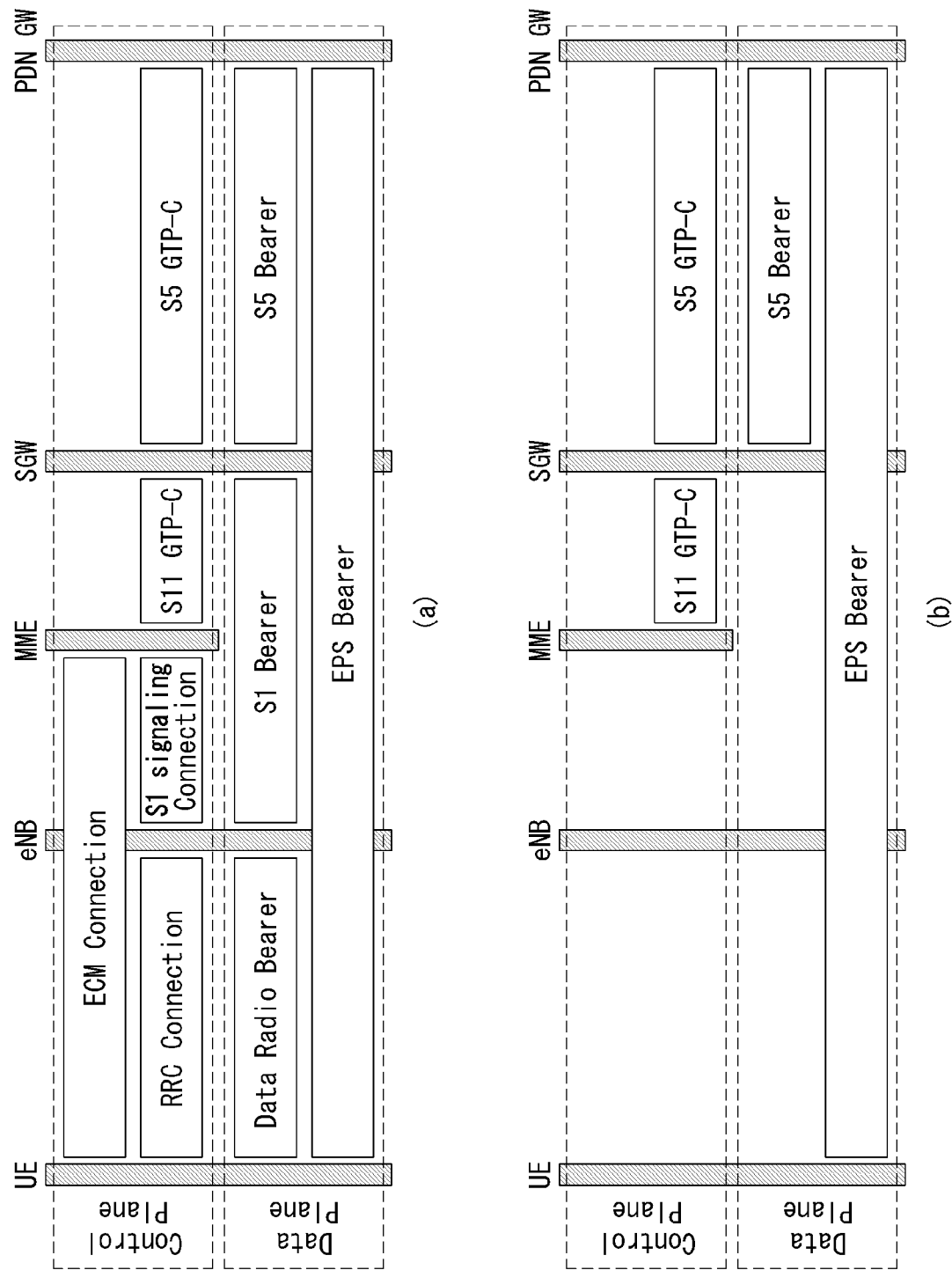
FIG. 8 is a diagram illustrating transmission paths of a control plane and a user plane in an EMM registration state in a wireless communication system to which the present invention may apply.

FIG. 8 illustrates transmission paths of a control plane and a user plane in an EMM registration state in a wireless communication system to which the present invention may apply.

(a) of FIG. 8 illustrates ECM-CONNECTED state, and (b) of FIG. 8 illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in (a) of FIG. 8, in the ECM-CONNECTED state where user traffic is present, NAS signaling connection, namely, ECM connection (RRC connection and S1 signaling connection) is established. Also, S11 GTP-C (GPRS Tunneling Protocol Control Plane) connection is established between the MME and the SGW, and S5 GTP-C connection is established between the SGW and the PDN GW.

Also, in the ECM-CONNECTED state, the DRB, S1 bearer, and S5 bearer are all set up (that is, radio or network resources are allocated).

As shown in (b) of FIG. 8, in the ECM-IDLE state where there is no user traffic, the ECM connection (that is, RRC connection and S1 signaling connection) is released. However, the S11 GTP-C connection between the MME and the SGW and the S5 GTP-C connection between the SGW and the PDN GW are retained.

Also, in the ECM-IDLE state, the DRB and the S1 bearer are all released, but the S5 bearer is retained (that is, radio or network resources are allocated).

Figure 9:
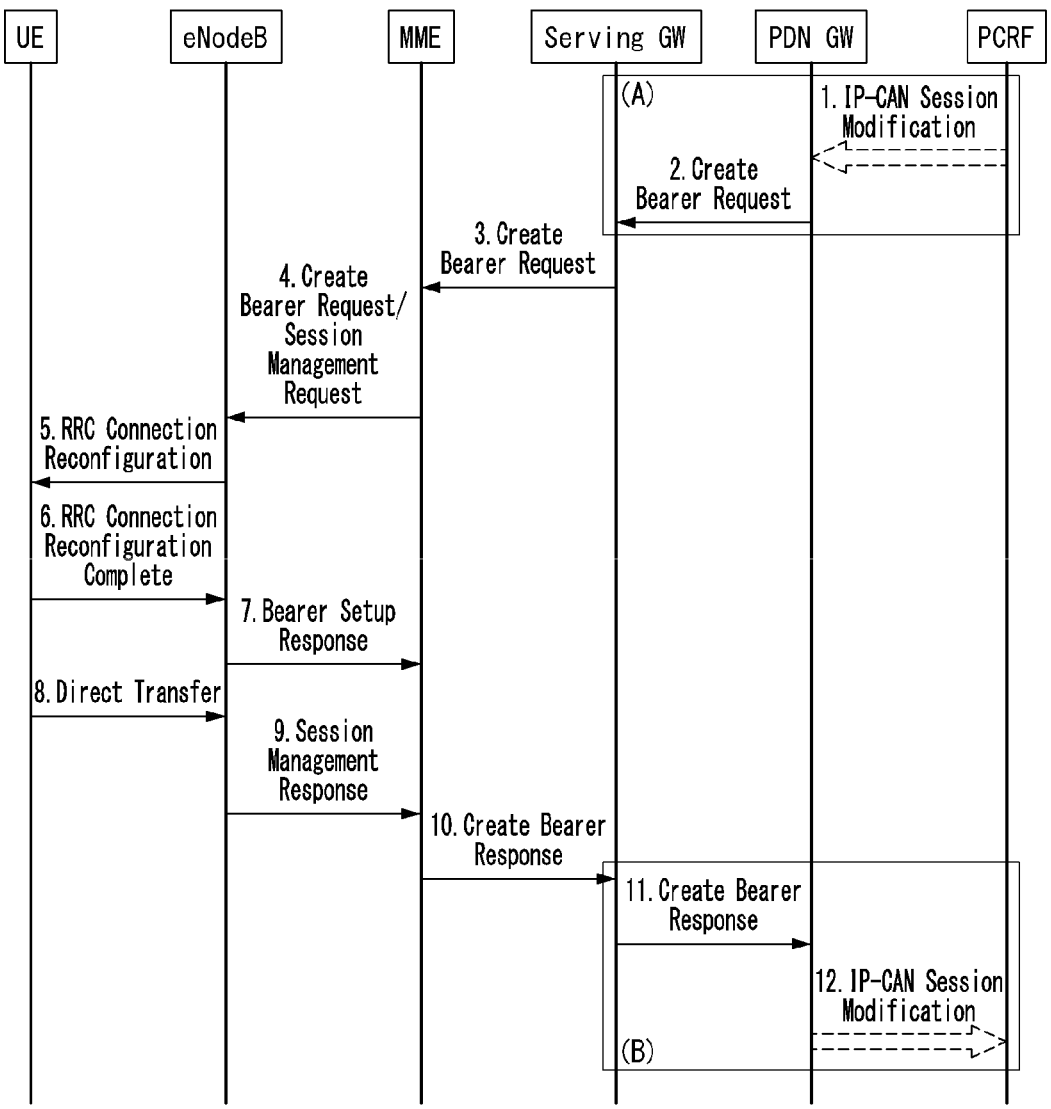
FIG. 9 is a diagram illustrating an example of a dedicated activation procedure.

FIG. 9 is a diagram illustrating an example of a dedicated activation procedure.

FIG. 9 is a flowchart illustrating the dedicated bearer activation procedure for S5/S8 based on a GPRS tunneling protocol (GTP).

First, when a dynamic PCC is disposed, the PCRF transmits a PCC decision provision (QoS policy) message to the PDN GW.

Next, the PDN GW transmits a Create Bearer Request (IMSI, PTI, EPS Bearer QoS, TFT, S5/S8 TEID, Charging Id, LBI, and protocol configuration options) message for requesting bearer creation to the serving GW.

Next, the serving GW transmits the Create Bearer Request (IMSI, PTI, EPS Bearer QoS, TFT, S5/S8 TEID, Charging Id, LBI, and protocol configuration options) message for requesting the bearer creation to the MME.

Then, the MME transmits the Create Bearer Request (the MME transmits the Create Bearer Request message to the MME. The MME) message to the eNodeB.

Next, the eNodeB transmits an RRC Connection Reconfiguration (Radio Bearer QoS, Session Management Request, EPS RB Identity) message to the UE.

Next, the UE transmits an RRC Connection Reconfiguration Complete message to the eNodeB to inform the radio bearer activation.

Next, the eNodeB transmits a Bearer Setup Response (EPS Bearer Identity, S1-TEID) message to the MME to inform the radio bearer activation.

Then, the UE transmits a Direct Transfer (Session Management Response) message to the eNodeB.

Then, the eNodeB transmits an Uplink NAS Transport (Session Management Response) message to the MME.

Next, the MME transmits a Create Bearer Response (EPS Bearer Identity, S1-TEID, User Location Information (ECGI)) message to the serving GW to inform the bearer activation to the serving GW.

Next, the serving GW transmits the Create Bearer Response (EPS Bearer Identity, S1-TEID, User Location Information (ECGI)) message to the PDN GW to inform the bearer activation to the PDN GW.

When the dedicated bearer activation procedure is triggered by the PCC Decision Provision message from the PCRF, the PDN GW indicates to the PCRF whether the requested PCC decision (QoS policy) is performed.

Figure 10:
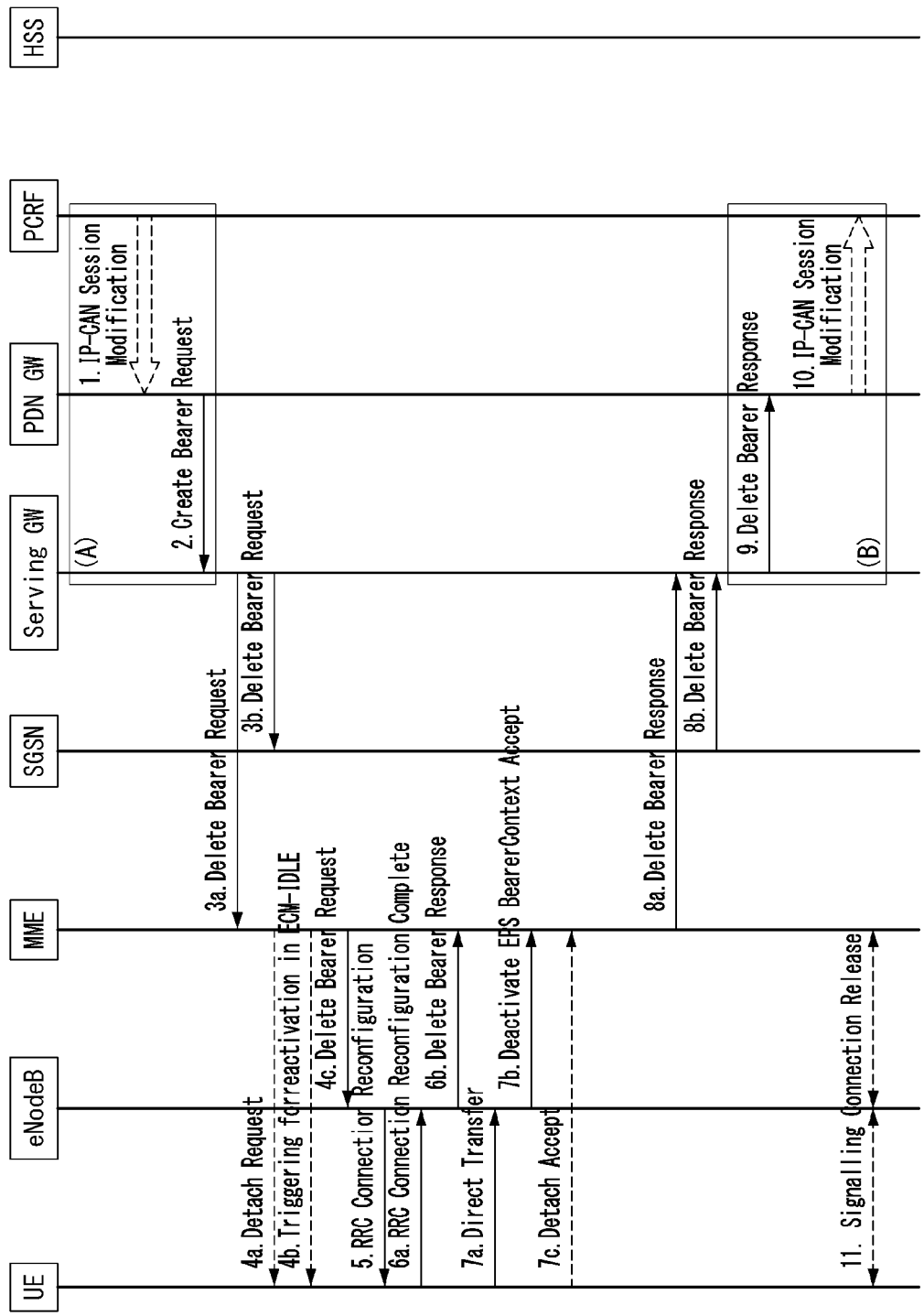
FIG. 10 is a diagram illustrating an example of a dedicated activation procedure.

FIG. 10 is a diagram illustrating an example of a dedicated activation procedure.

FIG. 10 is a flowchart illustrating the dedicated bearer activation procedure for S5/S8 based on the GPRS tunneling protocol (GTP).

The procedure of FIG. 10 may be used to deactivate a dedicated bearer or deactivate all bearers belonging to a PDN address.

When a default bearer belonging to the PDN connection is deactivated, the PDN GW deactivates all bearers belonging to the PDN connection. A specific procedure will be described with reference to FIG. 10.

Figure 11:
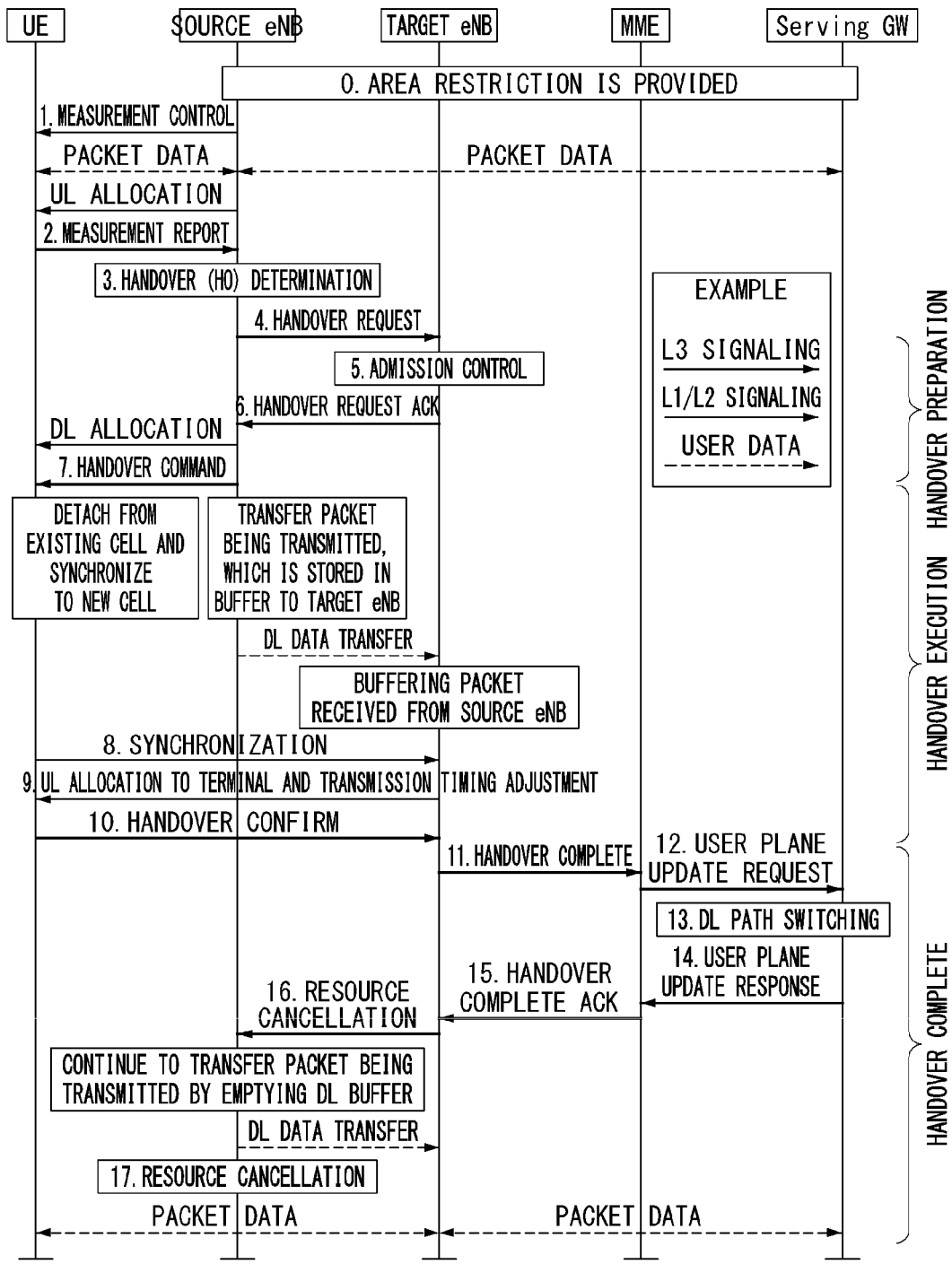
FIG. 11 illustrates a handover procedure defined in LTE (-A).

FIG. 11 illustrates a handover procedure defined in LTE.

FIG. 11 illustrates a case where the MME and a serving gateway are not changed.

A detailed handover process is as follows and may refer to 3GPP technical specification (TS) 36.300.

Step 0: A terminal context in a source base station (eNB) includes information on a roaming restriction given in connection configuration or recent TA update.

Step 1: The source base station configures a terminal measurement procedure according to area restriction information. The measurement provided by the source base station may help control the connection mobility of the terminal.

Step 2: The terminal is triggered to transmit a measurement report according to a rule set by (system information, etc.).

Step 3: The source base station determines whether to hand over the terminal based on the measurement report and radio resource management (RRM) information.

Step 4: The source BS transmits information required for handover (HO) to a target base station through a handover request message. The information required for the handover includes a terminal X2 signaling context reference, a terminal S1 EPC signaling context reference, a target cell ID, an RRC context including an identifier (e.g., a cell radio network temporary identifier (CRNTI), and the like.

Step 6: The target base station prepares L1/L2 and the HO and transmits a handover request acknowledge (Ack) message to the source base station. The handover request Ack message includes a transparent container (RRC message) transmitted to the terminal for performing the handover. The container includes a new C-RNTI and a security algorithm identifier of the target base station. Further, the container may further include additional parameters including a connection parameter, SIB, and the like.

In addition, the target base station may divide RA signatures into a non-contention based RA signature set (hereinafter, referred to as group 1) and a contention based RA signature set (hereinafter, referred to as group 2) and thereafter, select one signature in group 1 and inform the handover terminal of the selected signature in order to minimize handover latency.

That is, the container may further include information regarding a dedicated RA signature. Further, the container may also include information regarding an RACH slot duration for which the dedicated RA signature is to be used.

Step 7: The source base station creates an RRC message (e.g., RRCConnectionReconfiguration message) having mobility control information for the terminal for performing the handover and thereafter, transmits the created RRC message to the terminal.

The RRCConnectionReconfiguration message includes parameters (e.g., a new C-RNTI, a security algorithm identifier of the target base station, and information on the dedicated RACH signature, target base station SIB, etc. as an option) required for the handover and commands performing the HQ.

Step 8: The source base station transmits a serial number (SN) STATUS TRANSFER message to the target base station to transfer an uplink PDCP SN reception status and transfers a downlink PDCP SN transmission status.

Step 9: After receiving the RRCConnectionReconfiguration message, the terminal attempts to access a target cell using the RACH procedure. When a dedicated RACH preamble is allocated, the RACH proceeds based on non-contention and if not, the RACH proceeds based on the contention.

Step 10: The network performs uplink allocation and timing adjustment.

Step 11: When the terminal successfully accesses the target cell, the terminal transmits the RRCConnectionReconfigurationComplete message (CRNTI) to confirm the handover and transmits an uplink buffer status to inform the target base station of completion of the handover procedure. The target base station checks the C-RNTI received through a Handover Confirm message and starts data transmission to the terminal.

Step 12: The target base station transmits a Path Switch message to the MME to inform that the terminal changes the cell.

Step 13: The MME transmits a User Plane Update Request message to the serving gateway.

Step 14: The serving gateway switches a downlink data path to a target side. The serving gateway transmits an end marker packet to the source base station through the existing path and then, releases the user plane/TNL resource for the source base station.

Step 15: The serving gateway transmits a User Plane Update Response message to the MME.

Step 16: The MME responds to the path switch message using a path switch Ack message.

Step 17: The target base station transmits a UE Context Release message to inform the source base station that the HO is successful and triggers resource release.

Step 18: When receiving the UE Context Release message, the source base station releases a radio resource and a UE context associated user plane related resource.

Figure 12:
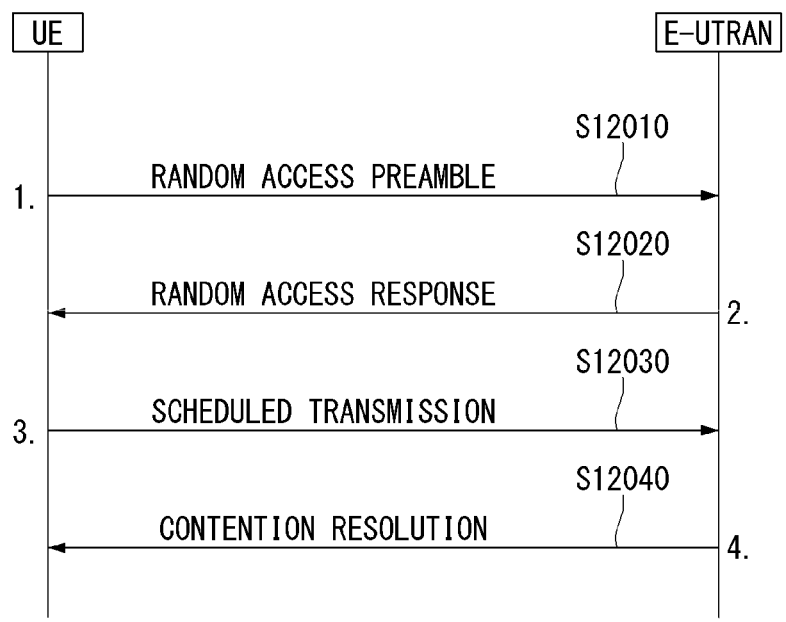
FIG. 12 is a diagram illustrating operational processes for a UE and an eNB in a contention-based random access procedure.

FIG. 12 is a diagram illustrating operational processes for a UE and an eNB in a contention-based random access procedure.

(1) Transmission of First Message

A UE may randomly select a random access preamble from a set of random access preambles indicated through system information or a Handover Command, select a Physical RACH (PRACH) resource capable of carrying the random access preamble, and transmit the random access preamble in the PRACH resource (S12010).

(2) Reception of Second Message

A method of receiving random access response information is similar to the above-described non-contention based random access procedure. That is, after transmitting the random access preamble in the step S12010, the UE attempts to receive a random access response thereof within a random access response reception window indicated through the system information or Handover Command by an eNB, and receives a PDSCH using corresponding RA-RNTI information (S12020). Through this, the UE may receive a UL grant, a temporary cell identifier (temporary C-RNTI), a time synchronization correction value (timing advance command: TAC) and the like.

(3) Transmission of Third Message

Upon receipt of a valid random access response, the UE processes information included in the random access response. That is, the UE applies the TAC and stores the temporary C-RNTI. In addition, the UE transmits data (i.e. a third message) to the eNB using the UL grant (S12030). The third message should include an ID of the UE. This is because the eNB cannot determine which UEs perform the random access procedure in the contention-based random access procedure and the UEs need to be identified for contention resolution.

Two methods have been discussed to include a UE identifier in the third message. According to a first method, if the UE has a valid cell identifier already allocated by a corresponding cell before the random access procedure, the UE transmits its own cell identifier by a UL transmission signal corresponding to the UL grant. On the other hand, if a valid cell identifier has not been allocated to the UE before the random access procedure, the UE transmits its unique identifier (e.g., an S-TMSI or a Random ID) in the third message. In general, the unique identifier is longer than a cell identifier. Once the UE has transmitted data corresponding to the UL grant, the UE starts a contention resolution timer.

(4) Reception of Fourth Message

After the UE transmits data including its own identifier through the UL grant that is included in the random access response, the UE awaits an indication from the eNB for contention resolution. That is, the UE may attempt to receive a PDCCH in order to receive a specific message (S12040). The UE may receive the PDCCH using two methods. In the case in which the UE has transmitted the third message in response to the UL grant using a cell identifier as its own identifier, the UE may attempt to receive a PDCCH using its own cell identifier. In the case in which the UE has transmitted the third message in response to the UL grant using an identifier specific to the UE as its own identifier, the UE may attempt to receive a PDCCH using a temporary C-RNTI included in the random access response. In the former case, when the UE has received a PDCCH through its own cell identifier before the contention resolution timer expires, the UE may determine that the random access procedure has been properly performed and then terminate the random access procedure. In the latter case, when the UE has received a PDCCH through a temporary C-RNTI before the contention resolution timer expires, the UE checks data carried in a PDSCH indicated by the PDCCH. If the UE-specific identifier is included in the data, the UE may determine that the random access procedure has been properly performed and then terminate the random access procedure.

Hereinafter, an RRC state of a UE and an RRC connection mechanism will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled.

On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

An NAS (Non-Access Stratum) layer located in an upper RRC layer performs session management and mobility management.

In order to manage the mobility of the UE, two states of EMM-REGISTERED (EPS Mobility Management-REGISTERED) and EMM-DEREGISTERED are defined, and the two states apply to the UE and the MME.

Initially, the UE is in the EMM-DEREGISTERED state, and in order for the UE to connect to the network, a process of registering to a corresponding network is performed through an initial attach procedure. When the attach procedure is successfully performed, the UE and the MME are in the EMM-REGISTERED state.

To manage a signaling connection between the UE and the EPC, two states of an ECM (EPS Connection Management)-IDLE state and an ECM-CONNECTED state are defined, and the two states are applied to the UE and the MME. When a UE in the ECM-IDLE establishes an RRC connection with the E-UTRAN, the corresponding UE is in the ECM-CONNECTED state.

When the MME in the ECM-IDLE state establishes an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a UE-based, mobility-related procedure such as cell selection or cell reselection without having to receive a command from the network. On the other hand, when the UE is in the ECM-CONNECTED state, the mobility of the UE is managed by a command from the network. When the location of the UE in the ECM-IDLE state is different from a location known to the network, the UE notifies the network of the UE's location through a tracking area update procedure.

Next, system information is described.

The system information includes essential information which must be known in order for a UE to connect to a base station. Therefore, the UE must receive all the system information before the UE is connected to the base station, and also the UE needs to have the latest system information. Since the system information is the information which must be known to all UEs within a cell, the base station periodically transmits the system information.

According to Section 5.2.2 of 3GPP TS 36.331 V8.7.0 (2009-09) "Radio Resource Control (RRC); Protocol specification (Release 8)," the system information is divided into MIB (Master Information Block), SB (Scheduling Block), and SIB (System Information Block). The MIB enables the UE to be aware of a physical configuration of a corresponding cell, for example, a bandwidth. The SB informs transmission information of the SIBs, for example, a transmission period. The SIB is a collection of system information that are related to one another. For example, a certain SIB includes information only about a surrounding cell and a certain SIB includes information only about an uplink radio channel used by the UE.

Generally, a service provided by the network to the UE can be divided into three types as below. In addition, the UE recognizes a cell type depending on which service is available. A service type is first described below and the cell type is described later.

1) Limited service: This service provides an emergency call and a disaster warning system (Earthquake and Tsunami Warning System; ETWS) and may be provided in an acceptable cell.

2) Normal service: This service means a public-use service for a general purpose and may be provided in a suitable or normal cell.

3) Operator service: This service means a service for a communication network operator, and this cell can be used only by the network operator, not by a general user.

Regarding the service type provided by the cell, the cell type may be classified as follows.

1) Acceptable cell: a cell in which the UE may be provided with a limited service. The cell is not barred and satisfies a cell's selection criteria.

2) Suitable cell: a cell in which the UE may be provided with a regular service. This cell satisfies a condition for the acceptable cell while satisfying additional conditions at the same time. The additional conditions are that this cell must belong to a PLMN (Public Land Mobile Network) to which a corresponding UE can connect and must be a cell in which the tracking area update procedure of the UE is not prohibited. If the corresponding cell is a CSG cell, this cell must be a cell to which the UE can connect to as a CSG member.

3) Barred cell: a cell which broadcasts information that the cell is barred through the system information.

4) Reserved cell: a cell which broadcasts information that the cell is reserved through the system information.

Figure 13:
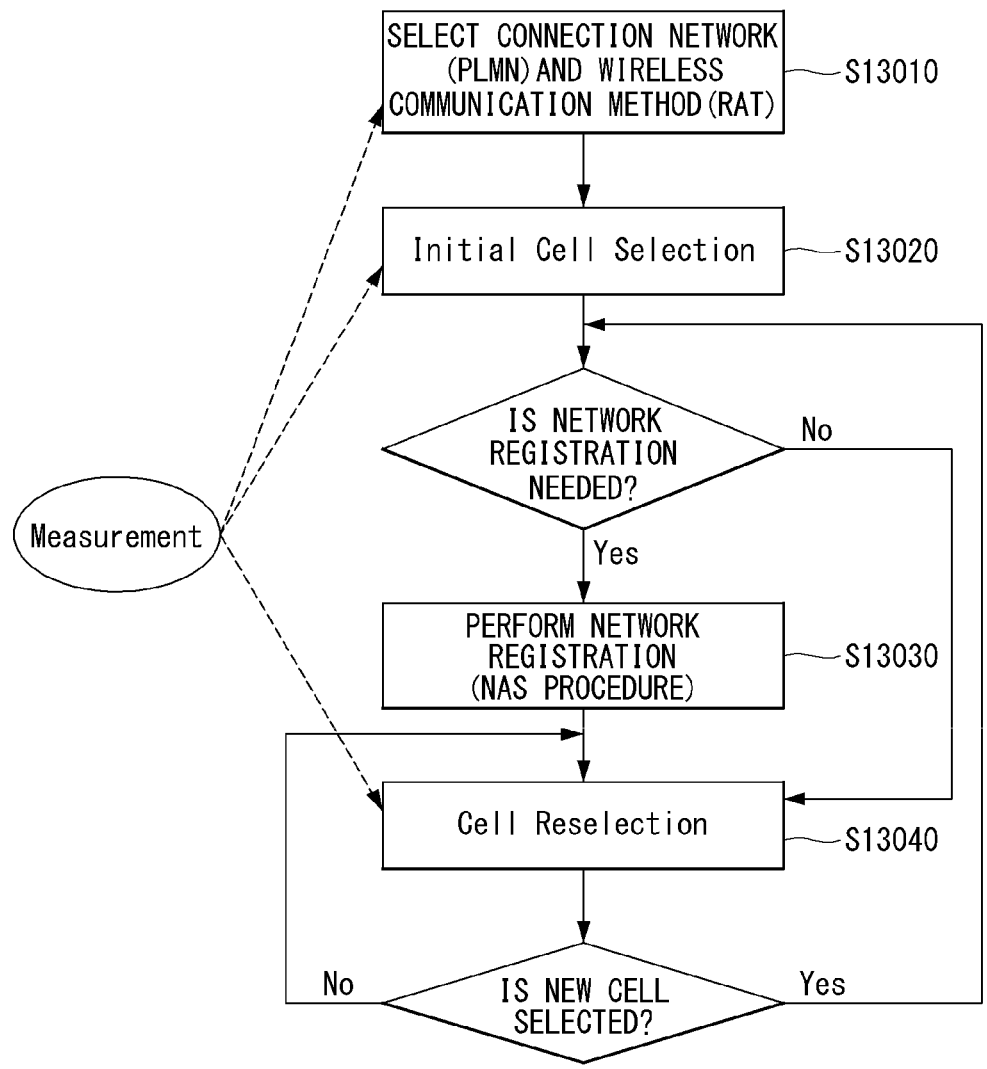
FIG. 13 is a flowchart showing an operation of a UE in an RRC idle state to which the present invention may apply.

FIG. 13 is a flowchart showing an operation of a UE in an RRC idle state to which the present invention may apply.

FIG. 13 shows a procedure in which a UE is registered to a network through a cell selection process when the UE is initially powered on and a cell reselection is performed when necessary.

Referring to FIG. 13, the UE selects a Radio Access Technology (hereinafter, referred to as "RAT") for communicating with a Public Land Mobile Network (hereinafter, referred to as "PLMN") from which the UE itself desires to receive a service (S13010). The information about PLMN and RAT may be selected by the user of the UE, and what is stored in the USIM (universal subscriber identity module) may be also used.

The UE selects a cell having the largest value among the cells that the measured base station has a value greater than a particular value in the signal intensity and quality (cell selection) (S13020). Then, it receives SI being sent by the base station. The particular value denotes a value defined by a system to guarantee the quality of physical signals in the data transmission and/or reception. Accordingly, the value may vary based on the RAT to be applied.

The UE registers its own information (for example, IMSI) for receiving a service (for example, paging) from a network (S13030). Here, the UE is not registered into a network to be accessed whenever selecting a cell but registered into a network in case when network information received from SI (for example, Tracking Area Identity (TAI)) is different from network information that the UE itself knows.

The UE performs cell re-selection based on a service environment provided in a cell, a terminal environment, or the like (S13040). If a value of the signal intensity and quality measured by the base station from which the UE receives a service is less than a value measured by the base station of the neighboring cell, then the UE selects one of the other cells providing signals having better characteristics than those of the cell of the base station being accessed by the UE. This process is called a cell reselection to distinguish it from an initial cell selection in the second step. At this time, a time restriction condition may be specified in order to prevent a cell from being frequently reselected based on the change of the signal characteristics.

Figure 14:
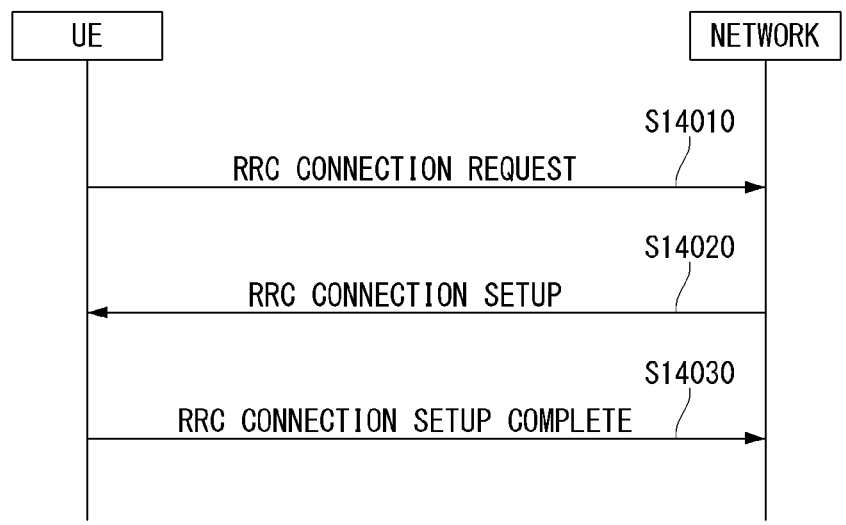
FIG. 14 is a flowchart showing an RRC connection establishment procedure to which the present invention may apply.

FIG. 14 is a flowchart showing an RRC connection establishment procedure to which the present invention may apply.

A UE sends to a network an RRC connection request message for requesting an RRC connection (S14010). The network sends an RRC connection setup message in response to the RRC connection request (S14020). After receiving the RRC connection setup message, the UE enters an RRC connection mode.

The UE sends to the network an RRC connection setup complete message used to confirm successful completion of the RRC connection establishment (S14030).

Figure 15:
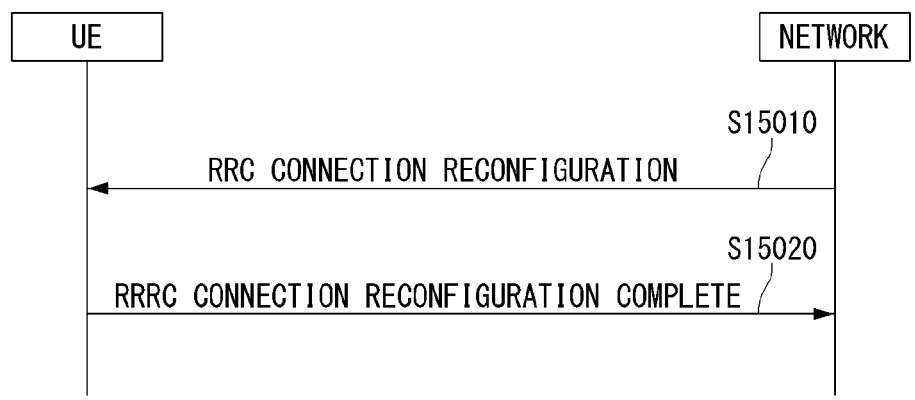
FIG. 15 is a flowchart showing an RRC connection reconfiguration procedure to which the present invention may apply.

FIG. 15 is a flowchart showing an RRC connection reconfiguration procedure to which the present invention may apply.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (S15010). In response to the RRC connection reconfiguration, the UE sends to the network an RRC connection reconfiguration complete message used to confirm successful completion of the RRC connection reconfiguration (S15020).

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a cell of a proper quality. For example, a terminal where power is turned-on just before should select a cell of a proper quality to registered in a network. If the terminal in an RRC connection state enters in an RRC idle state, the terminal should select a cell for stay in the RRC idle state. In this way, a procedure of selecting a cell satisfying a certain condition by the terminal in order to be in a service idle state such as the RRC idle state refers to cell selection. Since the cell selection is performed when a cell in the RRC idle state has not been selected, it is important to select the cell as soon as possible.

Accordingly, as long as the cell provides more than a certain level of radio signal quality, the cell may be selected during a cell selection procedure of the terminal, even if the cell does not provide the best radio signal quality.

A method and procedure of selecting a cell by a terminal in a 3GPP LTE is described with reference to 3GPP TS 36.304 V8.5.0 (2009-03) "User Equipment (UE) procedures in idle mode (Release 8)".

A cell selection is largely divided into two processes.

The first process is an initial cell selection process. In this process, UE does not have preliminary information about a wireless channel. Accordingly, the UE searches all wireless channels to find a suitable cell. The UE searches for the strongest cell in each channel. Thereafter, once the UE finds a suitable cell that satisfies cell selection criteria, the UE selects the corresponding cell.

Next, the UE may select the cell using stored information or using information broadcasted by the cell. Accordingly, cell selection may be quickly done compared to an initial cell selection process. As long as the UE finds a cell that satisfies the cell selection criterion, the UE selects the corresponding cell. If any suitable cell that satisfies the cell selection criterion is not found though such a process, the UE performs an initial cell selection process.

After the UE selects a certain cell through a cell selection process, the signal strength and quality between the UE and the base station may be changed due to the change of the UE mobility and wireless environment. Therefore, if the quality of the selected cell is deteriorated, the UE may select another cell providing better quality. If a cell is reselected in this manner, this cell, in general, should be a cell that provides better signal quality than the currently selected cell.

This process is called a cell reselection. In terms of radio signal quality, in general, a basic purpose of the cell reselection process is to select a cell providing best quality to the UE.

Apart from radio signal quality, the network may determine the priority for each frequency and notify the UE about this. Upon receiving the priority, the UE may take this priority into consideration more than the radio signal quality criterion during the cell reselection process.

As described above, there is a method of selecting or reselecting a cell based on the signal property of the wireless environment. When a cell is selected for reselection in the cell reselection process, the following cell reselection methods may be used, based on the RAT and frequency characteristics of the cell.

Intra-frequency cell reselection: A reselected cell is a cell having the same RAT and same center-frequency as a cell on which the UE is currently camping.

Inter-frequency cell reselection: A reselected cell is a cell having the same RAT as a cell on which the UE is currently camping but has a different center-frequency than it.

Inter-RAT cell reselection: A reselected cell is a cell using a RAT different from the RAT of a cell on which the UE is currently camping.

The principles of the cell reselection process are as follows.

First, the UE measures the qualities of a serving cell and a neighboring cell for the cell reselection.

Second, the reselection is performed based on the cell reselection criterion. The cell reselection criterion has the following features in relation to the measurement of the serving cell and the neighboring cell.

The intra-frequency cell reselection is basically based on ranking. The ranking defines an index value for evaluating the cell reselection and the cells are ordered in the order of the index value by using the index value. A cell having the best index is generally called the best ranked cell. The cell index value is basically a value obtained by the UE measures on the corresponding cell, to which a frequency offset or cell offset is used as necessary.

The inter-frequency cell reselection is based on a frequency priority provided by the network. The UE attempts to camp on a frequency having the highest frequency priority. The network may provide the frequency priority common for in-cell UEs through broadcast signaling or provide a frequency-specific priority for each UE through UE-dedicated signaling. The cell reselection priority provided through broadcast signaling may be called a common priority, and the cell reselection priority set for each UE by the network may be called a dedicated priority. If the UE receives the dedicated priority, the UE may receive the relevant validity time along with the dedicated priority. Upon receiving the dedicated priority, the UE starts the validity timer which is set to the received validity time. The UE applies the dedicated priority in the RRC idle mode while the validity timer is operating. When the validity timer expires, the UE discards the dedicated priority and applies the common priority again.

For the inter-frequency cell reselection, the network may provide the UE with a parameter (e.g., a frequency-specific offset) used in cell reselection for each frequency.

For the intra-frequency cell reselection or the inter-frequency cell reselection, the network may provide the UE with a Neighboring Cell List (NCL) used in cell reselection. The NCL includes a cell-specific parameter (e.g., a cell-specific offset) used in cell reselection.

For the intra-frequency or inter-frequency cell reselection, the network may provide the UE with a cell reselection black list used in cell reselection. The UE does not perform cell reselection on a cell included in the black list.

Hereinafter, RLM (Radio Link Monitoring) is described.

A UE monitors downlink quality based on a cell-specific reference signal in order to detect downlink radio link quality of a PCell.

The UE estimates downlink radio link quality for the purpose of monitoring the downlink radio link quality of the PCell and compares the estimated quality with thresholds Qout and Qin. The threshold Qout is defined as a level that does not allow for stable reception via a downlink radio link, and this corresponds to a 10% block error rate of hypothetical PDCCH transmission considering PDFICH errors. The threshold Qin is defined as a downlink radio link quality level that allows for more stable reception than the threshold Qout, and this corresponds to a 2% block error rate of hypothetical PDCCH transmission, with PCFICH errors taken into account.

Hereinafter, a radio link failure (RLF) is described.

A UE continues to perform measurement in order to maintain the quality of a radio link with a serving cell receiving a service. The UE determines whether or not communication is impossible under the current circumstance due to a deterioration of the quality of the radio link with the serving cell.

If the quality of the serving cell is too low and thus communication is nearly impossible, the UE determines the current circumstance as a radio link failure.

If a radio link failure is determined, the UE abandons maintaining communication with the current serving cell, selects a new cell through a cell selection (or cell reselection) procedure, and attempts an RRC connection re-establishment to the new cell.

The UE, if the following problems occur on the radio link, may determine that RLF has occurred.

(1) First, it may be determined that RLF has occurred due to a physical channel problem.

If the quality of RS (reference signal) periodically received from an eNB over a physical channel is detected as equal to or smaller than a threshold, the UE may determine that an out-of-sync condition has occurred in the physical channel. If the out-of-sync condition occurs consecutively a specific number of times (e.g., N310), an RRC is notified about this. Having received an out-of-sync message from a physical layer, the RRC runs a timer T310, and waits for the problem with the physical channel to be solved while the timer T310 is running. If the RRC receives a message indicating that an in-sync condition has occurred consecutively a specific number of times (e.g., N311), from the physical layer while the timer T310 is running, the RRC determines that the physical channel problem has been solved and then stops the running timer T310. On the contrary, if the RRC receives no in-sync message until the timer T310 expires, the RRC determines that an RLF has occurred.

(2) It may be determined that an RLF has occurred due to a MAC random access problem.

The UE, while performing the random access procedure at the MAC layer, goes through random access resource selection→random access preamble transmission→random access response reception→contention resolution. The above overall process is referred to as one random access procedure, and unless this procedure is successfully done, the next random access procedure is carried out after waiting a backoff time. If such a random access procedure is unsuccessful despite a predetermined number (e.g., preambleTransMax) of attempts, the RRC is informed about this, and the RRC then determines that an RLF has occurred.

(3) It may be determined that an RLF has occurred due to an RLC maximum retransmission problem.

If AM (Acknowledged Mode) RLC is used at the RLC layer, the UE retransmits an RLC PDU that was not successfully transmitted.

However, if a predetermined number of (e.g., maxRetxThreshold) of attempts to retransmit a specific AMD PDU do not succeed in the AM RLC, the RRC is informed about this and the RRC then determines that an RLF has occurred.

The RRC determines that an RLF occurs due to the above three reasons. If an RLF occurs thusly, an RRC connection re-establishment is performed to re-establish an RRC connection with the eNB.

The RRC connection re-establishment procedure is performed as follows when an RLF occurs.

If the UE determines that a serious problem with an RRC connection has occurred, it performs an RRC connection re-establishment procedure in order to re-establish a connection with the eNB. The serious problem with the RRC connection may include the following five problems: (1) radio link failure (RLF); (2) handover failure; (3) mobility from E-UTRA; (4) PDCP integrity check failure; and (5) RRC connection reconfiguration failure.

If one of the above problems occurs, the UE runs the timer T311 and initiates an RRC connection re-establishment procedure. During this procedure, the UE goes through a cell selection random access procedure to connect to a new cell.

If a suitable cell is found through a cell selection procedure while the timer T311 is running, the UE stops the timer T311 and starts a random access procedure to the corresponding cell. However, if the UE cannot find a suitable cell until the timer T311 expires, the UE regards it an RRC connection failure and transitions to RRC_IDLE mode.

The RRC connection re-establishment procedure is now described below in greater detail.

Figure 16:
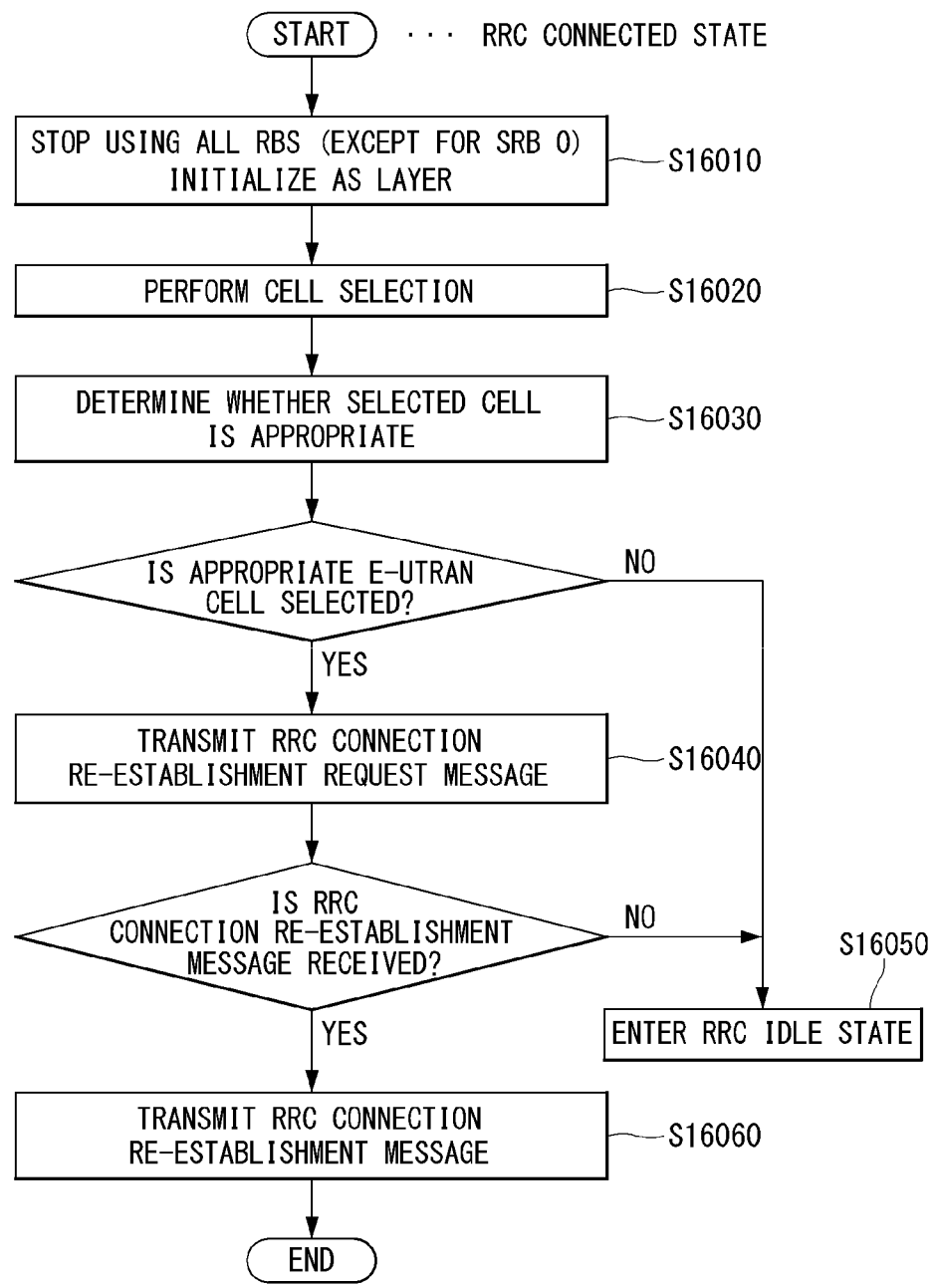
FIG. 16 is a view showing an example of an RRC connection re-establishment procedure to which the present invention may apply.

FIG. 16 is a view showing an example of an RRC connection re-establishment procedure to which the present invention may apply.

Referring to FIG. 16, the UE stops using all configured radio bearers except SRB 0 (Signaling Radio Bearer #0) and initializes various sub-layers of AS (Access Stratum) (S16010). Further, the UE sets up each sub-layer and physical layer as default configuration. During such procedure, the UE maintains the RRC connection state.

The UE performs a cell selection procedure for conducting an RRC connection reestablishment procedure (S16020). Although the UE maintains the RRC connection state during the RRC connection reestablishment procedure, the cell selection procedure may be performed in the same way as the cell selection procedure performed by the UE in the RRC idle mode.

After performing the cell selection procedure, the UE identifies the system information on a corresponding cell to determine whether the corresponding cell is a proper cell (S16030). If the selected cell is determined to be a proper E-UTRAN cell, the UE sends an RRC connection reestablishment request message to the corresponding cell (S16040).

On the other hand, if the cell selected through the cell selection procedure for performing the RRC connection reestablishment procedure is determined to be a cell using an RAT other than the E-UTRAN, the UE stops the RRC connection reestablishment procedure and enters the RRC idle state (S16050).

The UE may be implemented to complete checking whether the cell is proper within a limited time through the cell selection procedure and reception of the system information on the selected cell. To this end, the UE may run a timer as the UE initiates the RRC connection reestablishment procedure. If it is determined that the UE has selected a proper cell, the timer may be stopped. When the timer expires, the UE considers it a failure of the RRC connection reestablishment procedure and may enter the RRC idle mode. This timer is hereinafter referred to as a radio link failure timer. According to the LTE spec. TS 36.331, a timer named T311 may be used as the radio link failure timer. The UE may obtain set values for the timer from the system information of the serving cell.

Upon receiving the RRC connection reestablishment request message from the UE and accepting the request, the cell transmits an RRC connection reestablishment message to the UE.

Upon receiving the RRC connection reestablishment message from the cell, the UE reconfigures a PDCP sub-layer and an RLC sub-layer for SRB1. Further, the UE recalculates various key values relating to security configuration and reconfigures the PDCP sub-layer that is in charge of security with the newly calculated security key values.

By doing so, SRB 1 between the UE and the cell is opened, and RRC control messages may be communicated therebetween. The UE completes resuming SRB1 and sends to the cell an RRC connection reestablishment complete message indicating that the RRC connection reestablishment procedure is complete (S16060).

On the contrary, unless the cell receives the RRC connection reestablishment request message from the UE and accepts the request, the cell transmits an RRC connection reestablishment reject message to the UE.

Once the RRC connection reestablishment procedure is successfully done, the cell and the UE perform an RRC connection reestablishment procedure. By doing so, the UE restores to the state as it was before performing the RRC connection reestablishment procedure and guarantees maximum service continuity.

Next, RLF reporting is now described.

The UE, if an RLF or handover failure occurs, reports such a failure event to the network in order to support MRO (Mobility Robustness Optimisation) of the network.

After the RRC connection reestablishment, the UE may provide an RLF report to the eNB. The radio measurements contained in the RLF Report may be used to identify coverage issues as the potential cause of the failure. This information may be used to exclude those events from the MRO evaluation of intra-LTE mobility connection failures and redirect them as input to other algorithms.

In case the RRC re-establishment fails or the UE does not perform any RRC re-establishment, the UE may make the RLF Report available to the eNB after reconnecting from idle mode. For this purpose, The UE stores the latest RLF or handover failure related information, and indicates RLF report availability at each subsequent LTE RRC connection (re-)establishment and handover to an LTE cell until the RLF report is fetched by the network or for 48 hours after the RLF or handover failure is detected.

The UE keeps the information during state transitions and RAT changes, and indicates RLF report availability again after it returns to the LTE RAT.

Availability of the RLF Report at the RRC connection setup procedure is the indication that the UE suffered from a connection failure and that the RLF Report from this failure was not yet delivered to the network. The RLF Report from the UE includes the following information:

The E-CGI of the last cell that served the UE (in case of RLF) or the target of the handover (in case of handover failure). If the E-CGI is not known, the PCI and frequency information are used instead.

E-CGI of the cell that the re-establishment attempt was made at.

E-CGI of the cell that served the UE at the last handover initialization, i.e. when message 7 (RRC Connection Reconfiguration) was received by the UE.

Time elapsed since the last handover initialization until connection failure.

An indication whether the connection failure was due to RLF or handover failure.

The radio measurements.

Location of failure

The eNB receiving the RLF Report from the UE may forward the report to the eNB that served the UE before the reported connection failure. The radio measurements contained in the RLF Report may be used to identify coverage issues as the potential cause of the failure. This information may be used to exclude those events from the MRO evaluation of intra-LTE mobility connection failures and redirect them as input to other algorithms.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like. Measurement for such a purpose is generally called radio resource management (RRM) measurement.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identity (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band.

Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement.

The UE performs the intra-frequency measurement and reports a measurement result to the network at a proper time, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network at an appropriate time.

When the UE supports measurement on a heterogeneous network based on different RATs, measurement on a cell of the heterogeneous network may be performed according to a configuration of a base station. Such a measurement is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 17:
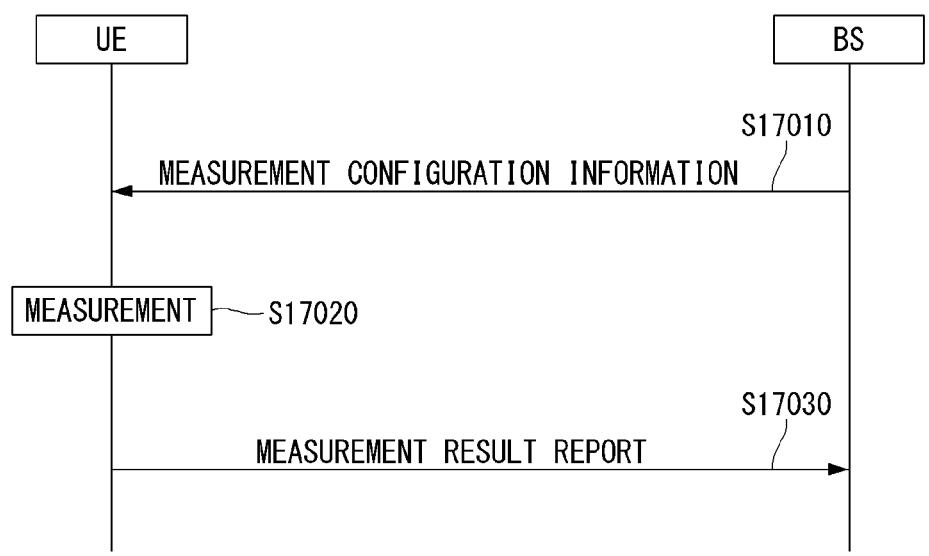

FIGS. 17 and 18 are diagrams illustrating an example of a method for performing measurement and setting of a measurement gap to which the present invention is applicable.

The terminal receives measurement configuration information from the base station (S17010). A message including the measurement configuration information is referred to as a measurement configuration message. The terminal performs the measurement based on the measurement configuration information (S17020). When a measurement result satisfies a reporting condition in the measurement configuration information, the terminal reports the measurement result to the base station (S17030). A message including the measurement result is referred to as a measurement report message.

The measurement configuration information may include the following information.

Measurement object information: Information on an object for which the terminal is to perform the measurement. The measurement object includes at least any one of an intra-frequency measurement object which is an intra-cell measurement object, an inter-frequency measurement object which is an inter-cell measurement object, and an inter-RAT measurement object which is an inter-RAT measurement object. For example, the intra-frequency measurement object indicates a neighbor cell having the same frequency band as a serving cell, the inter-frequency measurement object indicates a neighbor cell having a different frequency band from the serving cell, and the inter-RAT measurement object indicates a neighbor cell of am RAT different from the RAT of the serving cell.

Reporting configuration information: Information on a reporting condition and a reporting type as to when the terminal reports the transmission of the measurement result. The reporting configuration setting information may include a list of reporting configurations. Each reporting configuration may include a reporting criterion and a reporting format. The reporting criterion is a criterion that triggers the terminal transmitting the measurement result. The reporting criterion may be a period of measurement reporting or a single event for the measurement reporting. The reporting format is information regarding what type of measurement result the terminal is to configure the measurement result in.

Measurement identity information: Information regarding a measurement identity, which associates the measurement object with the reporting configuration to allow the terminal to determine what measurement object, in what type, and when the terminal is to perform the reporting. The measurement identity information is included in the measurement report message to indicate what measurement object the measurement is for and what reporting condition the measurement reporting is performed under.

Quantity configuration information: Information on parameters for configuring filtering of a measurement unit, a reporting unit, and/or a measurement result value.

Measurement gap information: Information on the measurement gap which is a gap which may be used only for the measurement by the terminal without considering transmission data with the serving cell as downlink transmission or uplink transmission is not scheduled. That is, no data is transmitted and received in the measurement gap.

Table 2 below is a table showing an example of a pattern of the measurement gap.

TABLE 2

| Gap pattern ID | Measurement gap length (MGL, ms) | Measurement gap repetition period (MGL, ms) | Minimum usage time for inter-frequency measurement and inter-RAT measurement for 480 ms | Measurement purpose |
| --- | --- | --- | --- | --- |
| 0 | 6 | 40 | 60 | Inter-Frequency E-UTRAN DDF and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

FIG. 18 illustrates an example in which a measurement gap is configured when gap pattern (gp) is set to 40 ms and gapoffset is set to 2.

The terminal has a measurement object list, a measurement reporting configuration list, and a measurement identity list in order to perform the measurement procedure.

In the 3GPP LTE, the base station may configure only one measurement object for one frequency band to the terminal. Events which trigger the measurement reporting shown in Table 3 below are defined according to Section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 3

| Event | Reporting Condition |
| --- | --- |
| Event A1 | Serving becomes better than threshold |
| Event A2 | Serving becomes worse than threshold |
| Event A3 | Neighbour becomes offset better than Serving |
| Event A4 | Neighbour becomes better than threshold |
| Event A5 | Serving becomes worse than threshold1 and neighbor becomes better than threshold2 |
| Event B1 | Inter RAT neighbour becomes better than threshold |
| Event B2 | Serving becomes worse than threshold1 and inter RAT neighbor becomes better than threshold2 |

When the measurement result of the terminal satisfies the configured events, the terminal transmits the measurement report message to the base station.

One of fields where is getting more and more important and becomes concrete in 5G mobile communication technology is reliable communication.

The reliable communication means a new communication service realized through error free transmission or service availability in order to realize a mission critical service (MCS).

The reliable communication as part of machine-to-machine (M2M) communication that meets real-time requirements for traffic safety, traffic efficiency, e-health, efficient industrial communication, and the like is recognized in terms of a necessity thereof.

Further, in the reliable communication, reliable connection needs to be provided for an application sensitive to latency such as the traffic safety or mission critical machine-type communications (MTCs) for a special purpose.

In addition, the reliable communication is also needed for purposes including medical/emergency response, remote control, sensing, and the like.

Tremendous enhancements of the MCSs are expected to be required in terms of end-to-end latency, ubiquity, security, availability/reliability, and the like compared to UMTS/LTE and LTE-A/Wi-Fi in the related art.

That is, the commercial wireless technologies (including 3GPP LTE and LTE-A) proposed so far do not guarantee sufficient performance to provide various MCSs in terms of real-time requirements and reliability requirements.

Further, the metric called the reliability may be an 'evaluation criterion for describing the quality of a radio link connection to satisfy a specific service level'.

In addition, the metric for the service availability may be referred to as radio link availability (RLA) and may be defined like RLA=Pr (RLQ>=QoE) when quality of experience (QoE) is expressed in terms of link quality.

Herein, the RLQ is a measured radio link quality and the QoE is a QoE requirement in terms of the link quality.

In addition, as applicable scenarios of a 5G mobile communication environment to the MCSs, the following services may be exemplified.

Remotely controlling a robot arm to realize industrial automation or transporting heavy large cargoes through remote control of automated guided vehicles (AGVs)

Drone remote control to provide logistics delivery, a remote medical service, and various other public services Safely exchanging information required between vehicles to provide an autonomous driving service or safely transferring a safety signal that informs a hidden vehicle or forward collision that is not captured by a sensor (a camera, a radar, etc.) of the vehicle In the above-mentioned services, a different available alternative base station link is determined as soon as the quality of the radio link (serving link) quality of the serving base station deteriorates, so that when the radio link quality of the serving base station falls to an extent not suitable for the MCSs, the terminal rapidly switches the current radio link to an available multi-link of the alternative base station, and as a result, the terminal should be able to be seamlessly provided with the services.

Therefore, when it is determined that it is not suitable to receive the MCSs by sensing the deterioration of the radio link quality of the serving base station, a method for quickly activating another multi-link and configuring an MCS bearer through the activated multi-link is required.

For this reason, in order to enable reliable communication of 5G the terminal utilizes all radio links around the terminal and instructs the quality of the radio link to be maximized according to a situation, and as a result, reduction of radio link outage for providing the MCS needs to be considered as an essential factor.

Further, in the LTE/LTE-A system in the related art, the terminal controls the RLF based on a plurality of timers.

As described above, the terminal does not recognize the RLF until a specific timer (e.g., T310) has expired and depending on the success of an RRC connection establishment procedure (connection Re-establishment) before another timer (e.g., T311), the terminal maintains an RRC connection or transits to an RRC idle state.

Future 5G mobile communication should meet an error occurrence rate of $10^{-6}$ or less and the RLA requirements of $10^{-6}$ or less to support the MCSs such as industrial automation, drone remote control, vehicle autonomous driving, and the like.

Therefore, the 5G aims to construct a high-reliability system in which the terminal may continuously receive the MCSs while not feeling the radio link outage.

However, since the current LTE/LTE-A system is designed to treat a recovery from the RLF fairly conservatively, the current LTE/LTE-A has a problem in that it is difficult to search other available link base stations which may be quickly replaced according to a channel condition of the terminal and secure an available multi-link base station for connection switching to the corresponding multi-link base stations.

In order to solve the problem, methods are proposed in which the terminal secures a plurality of base station links when accessing the network to possess the multi-link base stations which be replaced quickly even though the channel condition of the serving base station link becomes worse.

That is, in the method in the related art to be described below, a method for configuring multiple connections (or multi-link) to a plurality of base stations by the terminal by transmitting an indicator indicating, when the terminal accesses the network, that the terminal is an MCS capable terminal is described.

However, even when the multiple connections are configured between the terminal and the plurality of base stations, when the same measurement gap is configured for the serving base station and the alternative base stations and the same measurement gap is applied to the terminal, a gap may generated in which the terminal may not transmit and receive uplink/downlink data to and from the serving base station and the alternative base stations during inter-frequency measurement in the measurement gap.

When there is MCS data to be transmitted and received by the terminal in such a measurement gap, there arises a problem that low latency and interruption of high-reliability services occur.

Accordingly, in order to solve such a problem, the present invention proposes a method that may transmitting and receiving data by performing measurement by setting the measurement gap in the related art when the MCS data is generated.

The terms used below are defined as follows.

The multi-link refers to a plurality of radio links in which the terminal is connected with the plurality of base stations.

The multi-link may include a serving link and at least one multi-link.

The serving link indicates a radio link in which the terminal is connected with the serving base station and the multi-link means a radio link in which the terminal is connected with the base station other than the serving base station.

A meaning of the multi-link and a related operation thereof will be described in more detail with reference to FIG. 19 to be described below.

Herein, the base station other than the serving base station may be represented as the alternative base station, a candidate (target) base station, a neighbor base station, a target base station, or the like.

The serving base station refers to a base station that has an active RRC connection with the terminal and currently receives the service.

The alternative serving base station represents a new serving base station that replaces the serving base station in deterioration (or degradation) in quality of the radio link of the serving base station to be described below.

The alternative serving base station may be any one alternative base station of alternative base stations in which an alternative link of an SRB inactive (RRC deactivated) state is configured. Alternatively, the alternative link in the SRB inactive state may be an alternative base station transited to the alternative link in the SRB active state in accordance with deterioration in link quality of the serving base station.

An additional alternative base station represents an alternative base station in which the multi-link is additionally discovered by a terminal other than a predetermined alternative base station to be described below to be additionally configured.

Link connection may refer to radio connection with the base station and may be expressed as configuration of the radio link, establishment of the radio link, or the like.

Further, multi-link connection (or configuration) may be expressed as multi-connection, alternative link connection, or the like.

Hereinafter, the multi-link configuration and the alternative link configuration are mixed as necessary.

Multi-Link Definition and Related Operation Therewith

Figure 19:
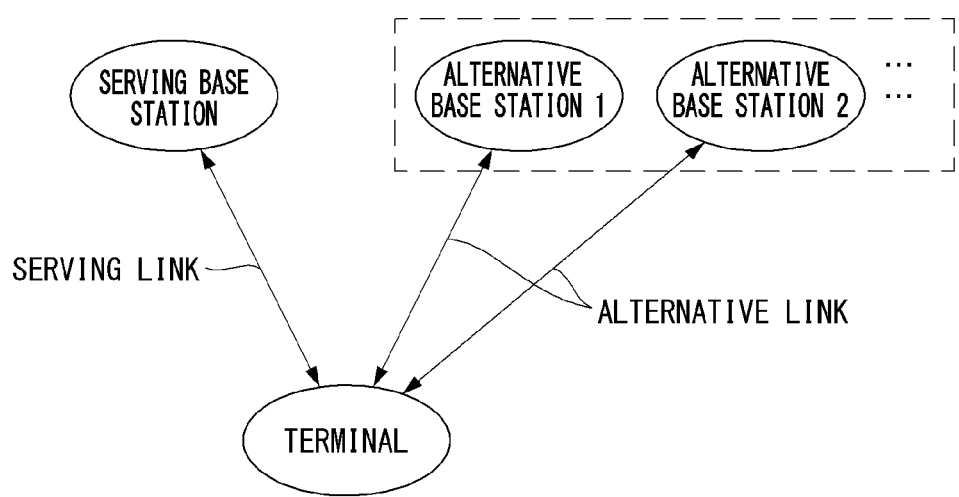
FIG. 19 is a diagram illustrating a conceptual view of multi-links to which methods proposed by the present specification are applicable.

FIG. 19 is a diagram illustrating a conceptual view of multi-links to which methods proposed by the present specification are applicable.

As defined above, the multiple connection or multi-link includes the serving link and at least one multi-link.

The serving link refers to the radio link between the terminal and the serving base station and in the serving link, in general, both a signaling radio bearer (SRB) and a data radio bearer (DRB) are in an active state.

The alternate link indicates the radio link between the terminal and at least one alternative base station, in which the SRB and the DRB in an inactive state are configured.

The multi-link is activated by an instruction to activate the terminal or the serving base station, and as a link concept having a different state from a general dormant mode, may be an event-triggered dormant mode.

That is, the terminal having the multi-link in the SRB inactive state with the alternative base station sends the activation instruction directly to the alternative base station or sends an activation request to the serving base station, and remains in a sleep state in the alternative link until receiving a response thereto.

This means that the terminal may transmit the RRC message directly to the alternative base station through the alternative link at any time and the alternative base station may transmit the RRC message to the terminal only after receiving an activation indicator directly from the terminal UE or through the serving base station.

Further, the terminal may receive information on the maximum number of multi-links that may be connected to the neighbor alternative base station through a broadcast message such as SIB or the like from the serving base station in advance.

In addition, when the maximum number of multi-links is not more than the number of multi-links which may be configured by the terminal, the terminal may additionally configure the multi-link with the neighbor alternative base station that satisfies a specific condition (QMCS).

Multi-Link Configuration Method

First, before examining a method for transmitting and receiving data by dividing and applying the measurement gap proposed in the present specification, a method for configuring the multi-link when the terminal accesses the network, a method for configuring a network indication-based multi-link, and a method for configuring the multi-link according to a link quality value will be briefly described.

The method for configuring the multi-link when accessing the network relates to a method in which the terminal configures the multi-link with the neighbor alternative base station.

Herein, the case where the terminal is connected to the network may be an initial network connection procedure of the terminal, a network connection procedure in the case where the mission critical service (MCS) occurs in an idle state.

The method for configuring the multi-link when accessing the network relates to a method for configuring the multi-link with the alternative base station in order to support the MC when the terminal is connected to the network.

In addition, the method for configuring the multi-link in the network connection may be applied to both (1) a case where there is no need to synchronize the terminal with the alternative base station and (2) a case where the terminal and the alternative base station need to synchronize with each other.

Herein, a case where synchronization does not need to be performed corresponds to (1) a "small cell environment" in which a timing advance (TA) between the terminal and the alternative base station (or a small base station) or (2) an environment in which an asynchronous system based on a new waveform is constructed.

In contrast, in the method for configuring the network indication-based multi-link as a method for solving a problem that the multiple connections are unnecessarily configured when the terminal is not always provided with the MCS, when the MCSs are provided to the terminal which RRC-connected, it is possible to configure or release the multiple connections as necessary.

In the method configuring the multi-link according to the link quality value, the multiple connections may be configured or released according to a change in link quality value indicator indicating the radio link quality of the serving base station or the alternative base station. Unlike the method for configuring the multi-link in the network connection and the method for configuring the network indication-based multi-link described above, the method for configuring the multi-link according to the link quality value is a method in which, the alternative base station first informs the terminal of the link quality value indicator so as to allow the terminal to configure the multiple connections before the radio link quality substantially deteriorates.

By such a method, when the terminal has the multi-link with the plurality of base stations, the terminal has an active-state connection (active-state serving link) with the serving base station and an inactive state connection (inactive-state multi-link) with the alternative base station.

The active-state serving link may mean that the terminal configures an active signaling radio bearer (SRB)/an active data radio bearer (DRB) with the serving base station and the inactive-state multi-link may mean that the terminal configures the inactive SRB and the active DRB with the alternative base station.

Further, through the network connection, the serving base station configures an S1-U bearer with the S-GW to configure the E-RAB and this means that the EPS bearer is configured together with the S5/S8 bearer between the S-GW and the P-GW.

Meanwhile, since the alternative base station that configures the multi-link with the terminal configures the S-GW and the S1-U bearer and configures the DRB with the terminal, the E-RAB is configured. In this case, the P-GW and the S5/S8 bearer may be similarly configured.

As described above, the inactive SRB (or SRB inactive state) has a different state than the normal (LTE/LTE-A system) dormant mode or dormant state.

The SRB inactive state may be expressed as an SRB inactive mode.

That is, the general dormant mode refers to a mode used for power saving of an RRC connected terminal.

For example, when there is no data to be received by the terminal in DL, the terminal enters the dormant mode, repeatedly sleeps and wakes up to reduce unnecessary power consumption of the terminal.

In contrast, the SRB inactive mode (or state) used in the present specification refers to a state where the terminal continuously sleeps when there is no separate SRB active instruction.

The SRB inactive mode may be defined as a state activated by an instruction of the terminal or the serving base station.

Accordingly, the SRB inactive mode may be represented as an event-triggered dormant mode.

As described above, when multi-tier/multi-layer base stations are present in the coverage of the UE (in-coverage situation), in a case where the terminal determines that the quality of the serving link is not sufficient to receive the MCS, the terminal may reliably and seamlessly receive the MCS by securing the radio link with another base station that may guarantee a better radio link quality than the serving base station, that is, the alternative base station.

Further, four following modes may be considered according to the active or inactive states of the SRB and DRB of the multi-link between the terminal and the alternative base station.

1. First mode: SRB inactive and DRB inactive
2. Second mode: SRB inactive and DRB active
3. Third mode: SRB active and DRB inactive
4. Fourth mode: SRB active and DRB active In the methods proposed in the present specification, the second mode and the fourth mode, that is, two cases will be considered.

Specifically, in the second mode (SRB inactive state/DRB active state), the RRC connection of the alternative base station is inactivated, but when there is an alternative base station link satisfying the deteriorated link quality value due to deterioration of the link quality value of the serving base station, the DRB of the alternative base station is configured and the serving base station and the alternative base station may perform simultaneous transmission.

In the second mode, the EPS bearer satisfying the QoS for the MCS can be set, and the DRB is configured.

The fourth mode (SRB active state/DRB active state) is a state in which the inactivated RRC connection is activated by a separate activation indicator to exchange the RRC messages between the terminal and the base station.

In the fourth mode, the EPS bearer satisfying the QoS for the MCS may be configured and the DRB is configured.

Figure 20:
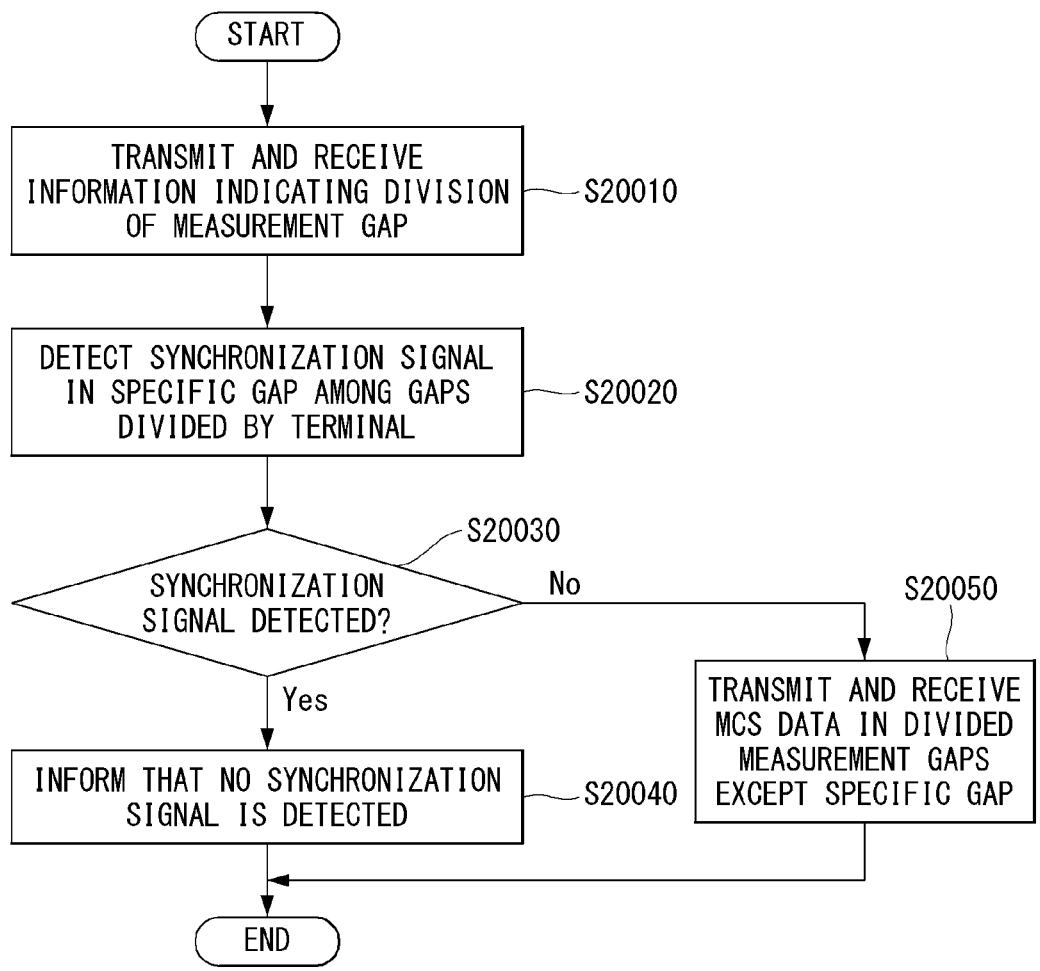
FIG. 20 is a flowchart illustrating an example of a method for transmitting and receiving data through divided measurement gaps proposed by the present specification.

FIG. 20 is a flowchart illustrating an example of a method for transmitting and receiving data through divided measurement gaps proposed by the present specification.

Referring to FIG. 20, the MCS data may be transmitted and received by performing the measurement only in a gap in which the measurement gap illustrated in FIGS. 17 and 18 is divided and a synchronization signal is detected.

That is, when a measurement gap in the related art is performed during N subframes, the measurement gap in the related art is divided into half or more, the measurement is performed only in a gap in which the synchronous signal is detected and data may be transmitted and received in remaining gaps among the divided gaps.

To this end, the serving base station transmits an indicator to divide the measurement gap for measuring a specific frequency into half or more and the terminal detects the synchronization signal (e.g., a primary synchronization signal (PSS)) from the neighbor base station in a first gap or a specific gap among the divided measurement gaps.

When the synchronization signal is detected in the first gap or the specific gap, the data is transmitted and received in the remaining gaps.

However, when the synchronization is not detected, the terminal informs the serving base station that the synchronized signal is not detected, so that the data may be transmitted and received in the period in which the synchronization signal is not detected.

For example, when the measurement gap is divided into the first gap and a second gap, the terminal detects the synchronization signal by performing the measurement in the first gap and when the synchronization signal is detected, the terminal informs the serving base station that the corresponding gap is configured as a gap for measuring an adjacent cell and the data may be transmitted and received in the second gap.

However, when the synchronization signal is not detected in the first gap, the terminal informs the serving base station that the synchronization signal is not detected in the first gap (thereby it can be seen that the synchronization signal may be detected in the second gap) and the data may be transmitted and received in the first gap.

In this case, the second gap may be configured as a gap for measuring the adjacent cell.

Hereinafter, a method for reducing the measurement gap in half will be described in detail.

When a network node (for example, mobility management entity (MME) intends to divide a previously configured measurement gap into two and perform the measurement only in the gap in which the synchronizing signal is detected in order to transmit and receive the MCS data, the network node transmits to the serving base station indication information (first indication information) indicating division of the measurement gap into two.

The serving base station that receives the indication information transmits the indication information to the terminal, divides the previously configured measurement gap into two and indicates the adjacent cell to perform the measurement in a specific measurement gap of the divided gaps (S20010).

The terminal divides the previously configured measurement gap into the first gap and the second gap and performs the measurement in the specific gap (e.g., the first gap) to detect the synchronization signal (e.g., the primary synchronization signal (PSS)) (S20020).

The terminal checks whether the synchronization signal is detected in the specific gap as a result of measurement in the specific gap (S20030).

When the synchronization signal is detected in the specific gap as a checking result, the terminal may configure the specific gap as the gap for measuring the adjacent cell and use the remaining gaps other than the specific gap for transmitting and receiving the MCS data (S20050).

However, when no synchronization signal is detected in the specific gap, the terminal may transmit indication information (second indication information) indicating that the synchronization signal is not detected in the specific gap to the serving base station (S20040) and use the specific gap for transmitting and receiving the MCS data. Further, the serving base station is informed that a gap other than the specific gap is configured as the gap for measuring the adjacent cell.

Through such a method, it is possible to detect the synchronization signal of the neighboring base station and shorten a measurement gap in which the data transmission and reception are impossible.

Figure 21:
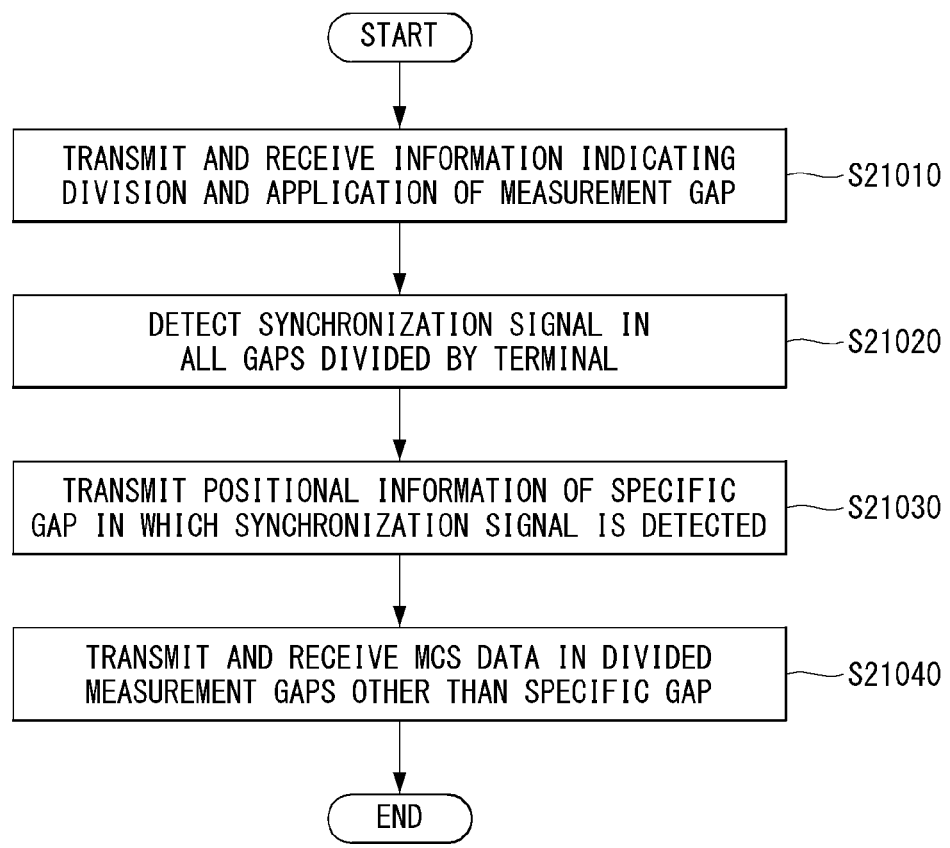
FIG. 21 is a flowchart illustrating another example of the method for transmitting and receiving data through divided measurement gaps proposed by the present specification.

FIG. 21 is a flowchart illustrating another example of the method for transmitting and receiving data through divided measurement gaps proposed by the present specification.

Referring to FIG. 21, the terminal may not know in which of the divided measurement gaps the synchronization signal will be detected.

Therefore, the terminal may perform the measurement in all of the divided measurement gaps and informs the serving base station of the gap in which the synchronization signal is detected, and use the gap other than the interval in which the synchronization signal is detected for transmitting and receiving the MCS data.

Hereinafter, the case where the measurement gap is divided into the first gap and the second gap will be described in detail.

When the network node (for example, mobility management entity (MME) intends to divide the previously configured measurement gap into two and perform the measurement only in the gap in which the synchronizing signal is detected in order to transmit and receive the MCS data, the network node transmits to the serving base station the indication information (first indication information) indicating division of the measurement gap into two.

The serving base station that receives the indication information transmits the indication information to the terminal and indicates the terminal to perform the measurement by dividing the previously configured measurement gap into two (S21010).

The terminal that receives the indication information divides the existing measurement gap into the first gap and the second gap and detects the synchronization signal (e.g., the primary synchronization signal (PSS)) by performing the measurement in the first and second gaps (S21020).

The terminal may transmit indication information (third indication information) including positional information of the subframe of the gap (the first gap or the second gap) in which the synchronization signal is detected as the measurement result.

It can be seen that the serving base station receiving the third indication may use a position of the subframe in which the synchronization signal is detected and the gap in which the synchronization signal is not detected for transmitting and receiving the MCS data.

Thereafter, the terminal may transmit and receive the MCS data to/from the serving base station in the gap in which the synchronization signal is not detected (S21040).

As described above, the previously configured measurement gap may be shortened to a minimum gap for the measurement through the methods described in FIGS. 20 and 21 and the MCS data may be transmitted and received through the shortened gap.

FIG. 22 is a diagram illustrating an example of the divided measurement gaps proposed by the present specification.

Referring to FIG. 22, when the measurement gap described in FIGS. 20 and 21 is constituted by six subframes, the measurement may be performed by dividing the measurement gap into two or three.

FIG. 22(a) illustrates an example of dividing the measurement gap into two. When the measurement gap is divided into two, the measurement gap may be divided into the first gap ad the second gap.

In this case, system frame numbers (SFNs) of the first gap and the second gap may be different from each other and when each of the first gap and the second gap is not constituted by three subframes, but the first gap is constituted by four subframes, the second gap is constituted by three subframes.

When the synchronization signal of the adjacent cell is transmitted in a third subframe and a fourth subframe of the measurement gap, that is, subframes 4 and 5 of FIG. 22(a), such a configuration is made to detect the synchronization signal.

Similarly, when the first gap is constituted by three subframes, the second gap may be constituted by four subframes.

FIG. 22(b) illustrates an example of dividing the measurement gap into three. When the measurement gap is divided into three, the measurement gap may be divided into the first gap, the second gap, and the third gap.

In this case, system frame numbers (SFNs) of the first gap, the second gap, and the third gap are different from each other and when the first gap is constituted by three subframes, the second gap includes two subframes and the third gap is constituted by three subframes.

The methods for dividing the measurement gap described in FIGS. 22(a) and 22(b) illustrate one example and various embodiments of dividing the measurement gap into two or more so that there may be one subframe overlaps other than the methods described in FIG. 22. For example, in the case of FIG. (b), when the first gap is constituted by two subframes, each of the second gap and the third gap may be constituted by three subframes.

The embodiment described in FIGS. 22(a) and 22(b) may be used when the measurement gap of the present invention is divided.

Figure 23:
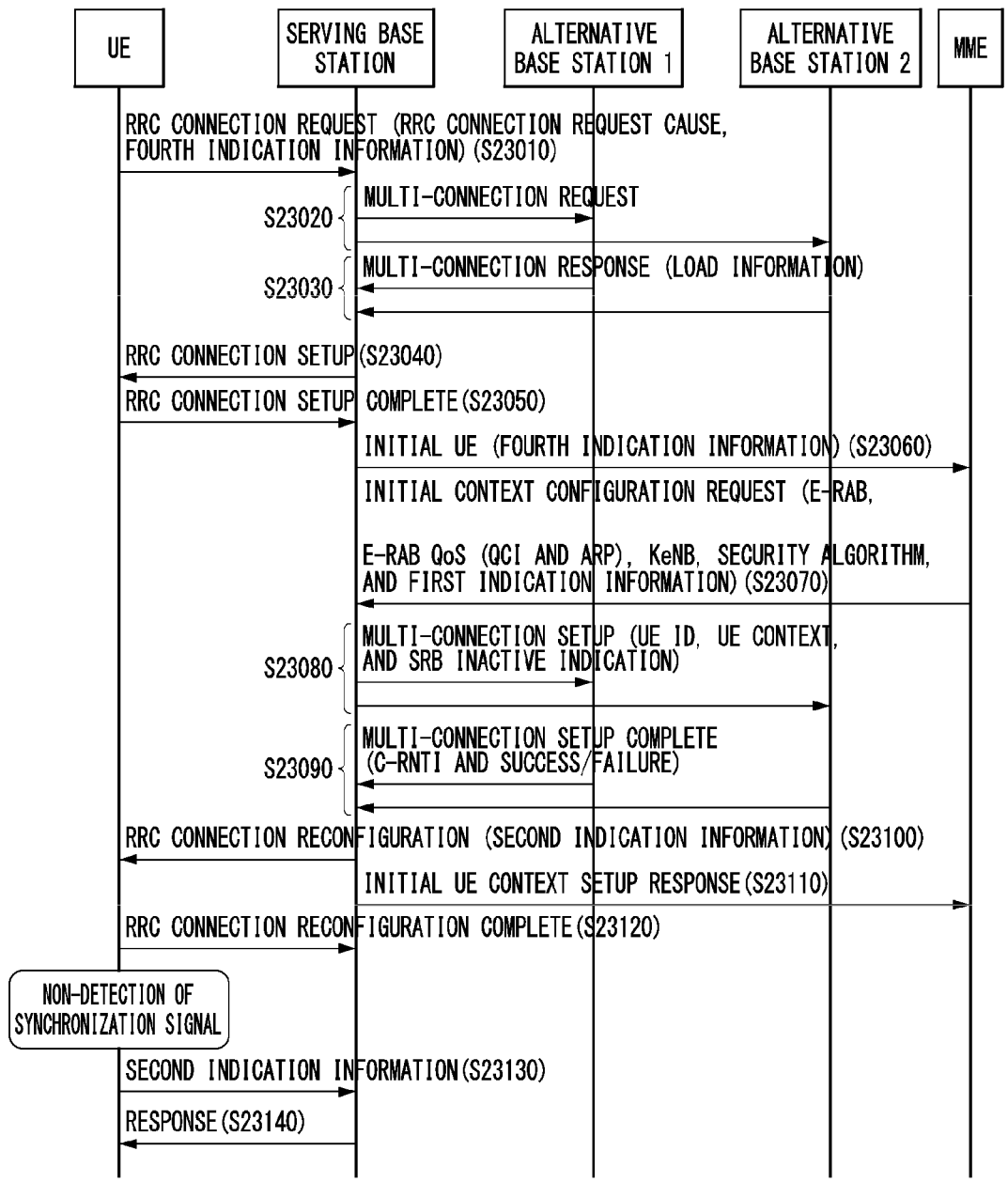
FIG. 23 is a flowchart illustrating an example of a method for dividing a measurement gap in the case of multiple connections during initial network connection proposed by the present specification.

FIG. 23 is a flowchart illustrating an example of a method for dividing a measurement gap in the case of multiple connections during initial network connection proposed by the present specification.

Referring to FIG. 23, in the method for performing the multiple connections in the network connection among the methods for configuring the multiple connections described above, the MCS data may be transmitted and received by shortening the measurement period through the method described in FIG. 21.

Specifically, the terminal transmits an RRC connection request message in order to request the RRC connection to the serving base station (S23010).

The RRC request message may includes a cause field indicating that the RRC connection request is a connection for the MCS, indication information (fourth indication information) indicating that the terminal supports the MCS, and list information indicating information on a candidate target base stations (alternatively, candidate alternative base stations).

The serving base station transmits a multi-connection request message to the alternative base stations and requests the multiple connections and information on a load status (S23020).

Representation of the multi-connection request message as an example may be referred to as various terms including a multi-link connection request message, an alternative link connection request message, an alternative link securing request message, and the like.

Thereafter, the serving base station receives a multi-connection response message including load status information indicating the load status of each of the alternative base stations in response to the multi-connection request message from the alternative base stations (S23030).

The multiple connection response message may also be referred to as another term described in the multi-connection request message.

The load status may indicate either high, medium, or low according to the load status of each of the alternative base stations.

The serving base station determines at least one alternative base station (alternative base stations 1 and 2) to configure the multiple connections with the terminal based on the load status information.

Thereafter, the serving base station transmits to the terminal an RRC connection setup message including an RRC connection setup message including an identifier (for example, the ID of the base station) of the serving base station and the C-RNTI allocated by the serving base station (S23040).

The terminal receives the RRC connection setup message and transmits an RRC connection setup complete message to indicate that the RRC connection setup is completed to the serving base station in response thereto to end the RRC connection procedure (S23050).

The RRC connection setup complete message includes an attach request including information such as IMSI, UE Network Capability, or the like.

The attach request may include an IMSI or an old GUTI, an Old GUTI type, a last visited TAI (if available), a UE Core Network Capability, UE Specific DRX parameters, extended idle mode DRX parameters, an Attach Type, Protocol configuration options, Ciphered Options Transfer Flag), KSIASME, NAS sequence number, NAS-MAC, additional GUTI, P-TMSI signature, Voice domain preference and UE's usage setting, MS Network Capability, and the like.

Further, the attach request may refer to information related to the NAS procedure.

The serving base station transmits an initial UE message to the network node (e.g., mobility management entity (MME)) (S23060).

The initial UE message may include the attach request, an eNB UE S1AP ID for configuring an S1 signaling connection, and the fourth indication information.

Thereafter, the network node assigns an MME UE S1AP ID to the terminal, thereby configuring the S1 signaling connection between the serving base station and the network node.

The S1 signaling connection is defined by a pair of identifiers (the eNB UE S1AP ID and the MME UE S1AP ID) allocated by the serving base station and the network node to identify a specific terminal.

The network node that makes the S1 signaling connection performs a procedure for configuring an EPS session and a default EPS bearer for the terminal and determines resources required for creating the E-RAB and information required for NAS signaling and transmits the determined resources and information to the serving base station.

That is, the network node transmits an attach accept to the terminal through the serving base station in response to the attach request.

The attach accept is transferred between the serving base station and the network node through an initial context setup request message and an RRC connection reconfiguration message is transferred between the serving base station and the terminal.

The network node that recognizes that the terminal is a terminal capable of transmitting and receiving the MCS data through the initial UE message transmits the initial context setup request message including indication information (first indication information) for indicating shortening/division of a predetermined measurement interval in order to transmitting and receive the MCS data to the serving base station.

In this case, the network node may transmit the initial context setup request message further including the E-RAB ID, the E-RAB QoS, the KeNB, and the security algorithm so that the serving base station configures the S-GW and the S1-U bearer and the serving base station configures the DRB with the terminal (S23070).

Hereinafter, the description will be made by assuming the case of dividing the measurement gap into two as illustrated in FIG. 22(a).

When the MCS data is transmitted from the S-GW through the first indication information transmitted from the first network, the serving base station divides the measurement gap previously configured for the terminal into two to perform the measurement only the first gap or the second gap and recognize that the remaining gasp may be used for transmitting the MCS data.

The serving base station holds transmission of the RRC connection reconfiguration message to the terminal until the configuration of the multiple connections is completed.

The serving base station obtains context information of the terminal from the network node through the initial context setup request message and transmits the multi-connection setup message to at least one alternative base station in order to configure the multiple connections with the at least one alternative base station (alternative base stations 1 and 2) through the obtained context information (S23080).

The context information of the terminal refers to context information of the terminal used for managing the terminal in the network, that is, UE ID, mobility (current location, etc.), session attributes (QoS, priority, etc.).

The multi-connection setup message may also be referred to as another term as described in the multi-connection request message.

The multi-connection setup message may include an identifier (e.g., UE ID) of the terminal, the context information of the terminal, signaling radio bearer (SRB) inactive indication information, and the like.

The SRB inactive indication information (fifth indication information) includes an indicator indicating that the SRB state of the alternative link configured with the at least one alternative base station (alternative base stations 1 and 2) is configured to inactive (or event-triggered dormant mode).

Then, the serving base station receives the multi-link connection setup response message in response to the multi-connection setup message from the at least one alternative base station (alternative base stations 1 and 2) (S23090).

The multi-connection setup complete message may also be referred to as another term as described in the multi-connection request message.

The multi-connection setup complete message may include information on the at least one alternative base station (alternative base stations 1 and 2).

That is, the multi-connection setup complete message may include the C-RNTI allocated to the terminal by the at least one alternative base station (alternative base stations 1 and 2), a result (success/failure) for the multi-connection setup, and the like.

The serving base station configures a matter related with the multi-connection setup, that is, the alternative link with the at least one alternative base station (alternative base stations 1 and 2) and transmits the RRC connection reconfiguration message to the terminal in order to inform of performing the measurement by shortening the predetermined measurement gap when the MCS data is transmitted (S23100).

The RRC connection reconfiguration message may include information received from the at least one alternative base station, the first indication information, a radio bearer QoS for indicating that the MCS bearer is configured, session management request information, EPS RB ID information, and the like.

Thereafter, the serving base station transmits an initial context setup response message to the network node in response to the initial context setup request message (S23110).

The terminal transmits an RRC connection reconfiguration complete message for informing that the multi-connection setup for the at least one alternative base station (alternative base stations 1 and 2) is completed to the serving base station (S23120).

The terminal that receives the first indication information may recognize that the measurement may be performed by shortening the predetermined measurement gap. That is, it may be recognized that the predetermined measurement gap is divided to perform the measurement only in a specific gap and other gaps may be used for transmitting and receiving the MCS data.

In this case, when the terminal detects the synchronization signal in the specific gap (the first gap) and may not detect the synchronization signal in the specific gap among the divided gaps through the first indication information, the terminal may request to change the gap for measurement of the adjacent cell to another gap divided in the specific gap.

The terminal divides the measurement gap into the first gap and the second gap and performs the measurement in the first gap. As a result of the measurement, when the synchronization signal (e.g., the primary synchronization signal (PSS)) is detected in the first section, the MCS data may be transmitted and received without performing the measurement in the second gap.

However, when the synchronization signal is not detected in the first gap, the terminal transmits to the serving base station indication information (second indication information) indicating that the synchronization signal is not detected in the first gap (S23130).

In this case, the terminal may request the base station to use the gap in which a synchronization signal is detected, that is, the second gap as the gap for measurement of the adjacent cell through the second indication information.

When receiving the second indication information, the serving base station may know that the synchronization signal is not detected in the first gap and that the terminal will perform the measurement of the adjacent cell in the second gap and transmit ACK to the terminal in response thereto (S23140).

However, when the second indication information is not received, the serving base station may know that the synchronization signal is detected in the first gap and thereafter, the terminal will perform the measurement in the first gap.

Thereafter, the serving base station may transmit the MCS data transmitted from the S-GW to the terminal in a specific gap (the first gap or the second gap) in which the synchronization signal is not detected.

Even when the MCS data is generated in a predetermined measurement gap through such a method, the MCS data may be transmitted by shortening the predetermined measurement gap.

In the present invention, dividing the predetermined measurement gap into two is exemplified, but there may be an embodiment in which the predetermined measurement gap is divided into three or more.

Figure 24:
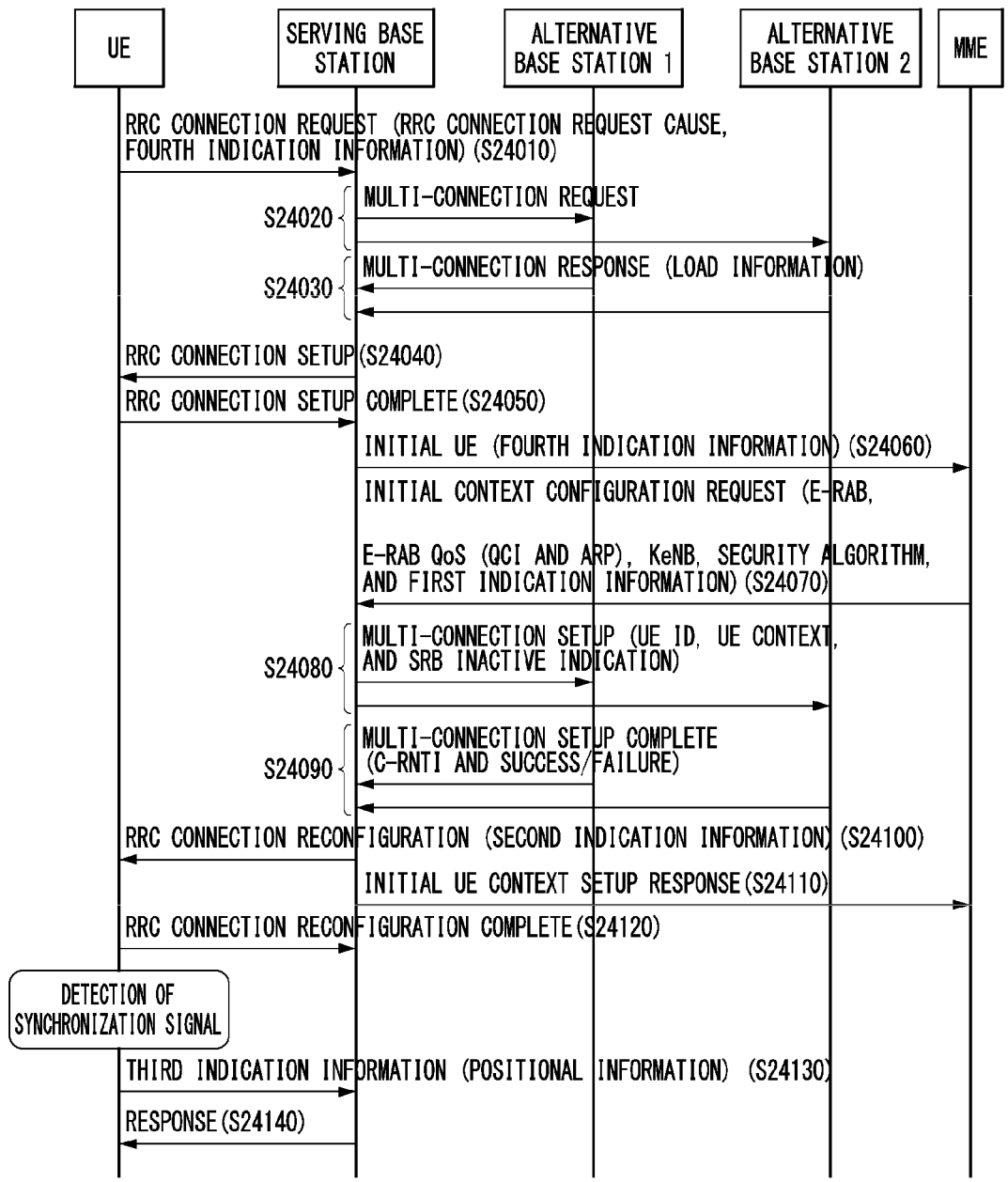
FIG. 24 is a flowchart illustrating yet another example of the method for dividing a measurement gap in the case of multiple connections during initial network connection proposed by the present specification.

FIG. 24 is a flowchart illustrating yet another example of the method for dividing a measurement gap in the case of multiple connections during initial network connection proposed by the present specification.

Referring to FIG. 24, unlike FIG. 23, the MCS data may be transmitted and received by shortening the predetermined measurement gap through the method described in FIG. 22. That is, the terminal that receives the division indication from the base station performs the measurement in the predetermined measurement gap before the division, determines in which gap after the division the synchronization signal is detected, and informs the base station that the gap in which the synchronization signal is used as the gap for measurement of the adjacent cell to transmit and receive the MCS data in the remaining gaps.

First, since steps S24010 to S24120 are the same as steps S23010 and S23120 of FIG. 23, a description thereof will be omitted.

In this case, unlike FIG. 23, the base station may request checking the gap in which the synchronization signal is detected and configuring the gap in which the synchronization signal is detected as the gap for measurement of the adjacent cell among the divided measurement gaps to the terminal through the first indication information.

The terminal that receives the first indication information may recognize that the measurement may be performed by shortening/dividing the predetermined measurement gap. That is, it may be recognized that the predetermined measurement gap is divided to perform the measurement only in a specific gap and other gaps may be used for transmitting and receiving the MCS data.

However, since the terminal receives the first indication information, but may not know in which gap the measurement is to be performed and in which gap the synchronous signal is to be detected, the terminal detects the synchronization signal in all measurement gaps.

That is, the terminal detects the synchronization signal in both the first and second gaps.

Thereafter, the terminal transmits indication information including positional information indicating in which gap of the first and second gaps the synchronization signal (for example, the primary synchronization signal (PSS)) is measured to the serving base station (S24130).

In this case, the terminal may request the base station to use the gap in which the synchronization signal is detected, that is, the second gap as the gap for measurement of the adjacent cell through the third indication information.

The serving base station may transmit the ACK to the terminal in response to the third indication information (S24140).

Thereafter, the serving base station may transmit the MCS data transmitted from the S-GW to the terminal in a specific gap (the first gap or the second gap) in which the synchronization signal is not detected.

Even when the MCS data is generated in a predetermined measurement gap through such a method, the MCS data may be transmitted by shortening the predetermined measurement gap.

In the present invention, dividing the predetermined measurement gap into two is exemplified, but there may be an embodiment in which the predetermined measurement gap is divided into three or more.

Figure 25:
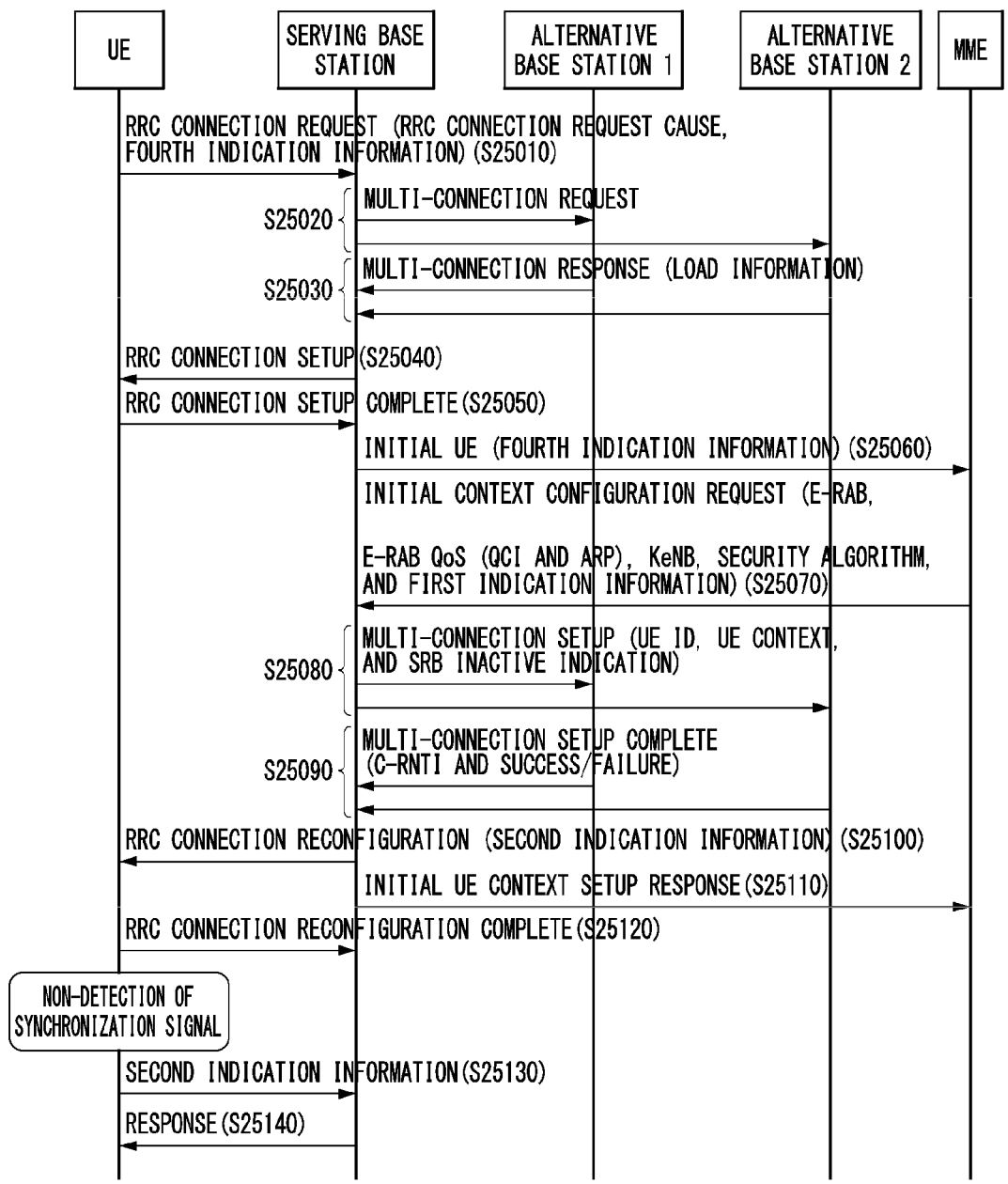

FIGS. 25 to 27 are diagrams illustrating an example of a method for setting divided measurement gaps and a set section in the case of the multiple connections during the initial network connection proposed by the present specification.

Referring to FIGS. 25 to 27, when dividing the preset measurement interval described in FIG. 23 or FIG. 24 into two, information related to the divided measurement gaps, for example, positions of the first gap and the second gap, an interval between the first and second gaps, a period between the first and second gaps, and the like may be configured.

First, since steps S25010 to S25090 are the same as steps S23010 and S23090, the description thereof will be omitted.

The multi-connection setup complete message of step S23090 may include information on the at least one alternative base station (alternative base stations 1 and 2).

That is, the multi-connection setup complete message may include the C-RNTI allocated to the terminal by the at least one alternative base station (alternative base stations 1 and 2), the result (success/failure) for the multi-connection setup, and the like.

The serving base station configures a matter related with the multi-connection setup, that is, the alternative link with the at least one alternative base station (alternative base stations 1 and 2) and transmits the RRC connection reconfiguration message to the terminal in order to inform of performing the measurement by shortening the predetermined measurement gap when the MCS data is transmitted (S25100).

The RRC connection reconfiguration message may include the information received from the at least one alternative base station, the first indication information, the radio bearer QoS for indicating that the MCS bearer is configured, the session management request information, the EPS RB ID information, and the like.

In this case, when the terminal detects the synchronization signal in the specific gap (the first gap) and may not detect the synchronization signal in the specific gap among the divided gaps through the first indication information, the terminal may request to change the gap for measurement of the adjacent cell to another gap divided in the specific gap.

In addition, the RRC connection reconfiguration message may further include configuration information for configuring the divided measurement gaps when the predetermined measurement gap is divided.

The configuration information may include positional information for configuring the positions of the divided measurement gaps, gap information for configuring the interval between the divided measurement gaps, and period information for configuring the period of the divided measurement gaps.

The positions, the interval, and the period of the divided gaps may be configured through the configuration information. For example, when the measurement gap is divided into the first gap and the second gap, the first gap may be constituted by three (or four) subframes and the second gap may be constituted by four (or three) subframes of system frame numbers (SFNs) that are far away from the first gap according to the period and the interval of the measurement gap included in the configuration information.

Thereafter, the serving base station transmits an initial context setup response message to the network node in response to the initial context setup request message (S25110).

The terminal transmits an RRC connection reconfiguration complete message for informing that the multi-connection setup for the at least one alternative base station (alternative base stations 1 and 2) is completed to the serving base station (S25120).

The terminal that receives the first indication information and the configuration information may recognize that the measurement may be performed by shortening/dividing the predetermined measurement gap. That is, it may be recognized that the predetermined measurement gap is divided to perform the measurement only in a specific gap and other gaps may be used for transmitting and receiving the MCS data.

The terminal that receives the configuration information may divide the predetermined measurement gap and configure the divided measurement gaps according to the configuration information.

FIGS. 26 and 27 illustrate an example of configuring the first gap and the second gap when the predetermined measurement gap is divided into two, that is, when the predetermined measurement gap is divided into the first gap and the second gap.

FIG. 26 illustrates a case where the interval between the first gap and the second gap is set to 10 subframes (10 ms) and the period between the first gap and the second gap is set to 20 subframes (20 ms).

FIG. 27 illustrates a case where only the interval between the first and second gaps is set to 10 subframes (10 ms).

Thereafter, the terminal performs the measurement in the first gap. As a result of the measurement, when the synchronization signal (e.g., the primary synchronization signal (PSS)) is detected in the first section, the MCS data may be transmitted and received without performing the measurement in the second gap.

However, when the synchronization signal is not detected in the first gap, the terminal transmits to the serving base station indication information (second indication information) indicating that the synchronization signal is not detected in the first gap (S25130).

In this case, the terminal may request the base station to use the gap in which the synchronization signal is detected, that is, the second gap as the gap for measurement of the adjacent cell through the second indication information.

When receiving the second indication information, the serving base station may know that the synchronization signal is not detected in the first gap and that the terminal will perform the measurement in the second gap and transmit the ACK to the terminal in response thereto (S25140).

However, when the second indication information is not received, the serving base station may know that the synchronization signal is detected in the first gap and thereafter, the terminal will perform the measurement in the first gap.

Thereafter, the serving base station may transmit the MCS data transmitted from the S-GW to the terminal in a specific gap (the first gap or the second gap) in which the synchronization signal is not detected.

Even when the MCS data is generated in the predetermined measurement gap, it is possible to transmit the MCS data by shortening and applying the predetermined measurement gap and to avoid a situation in which the synchronization signal may not be detected by configuring the interval, the positions, and the period of the divided measurement gaps.

In the present invention, dividing the predetermined measurement gap into two is exemplified, but there may be an embodiment in which the predetermined measurement gap is divided into three or more.

Figure 28:
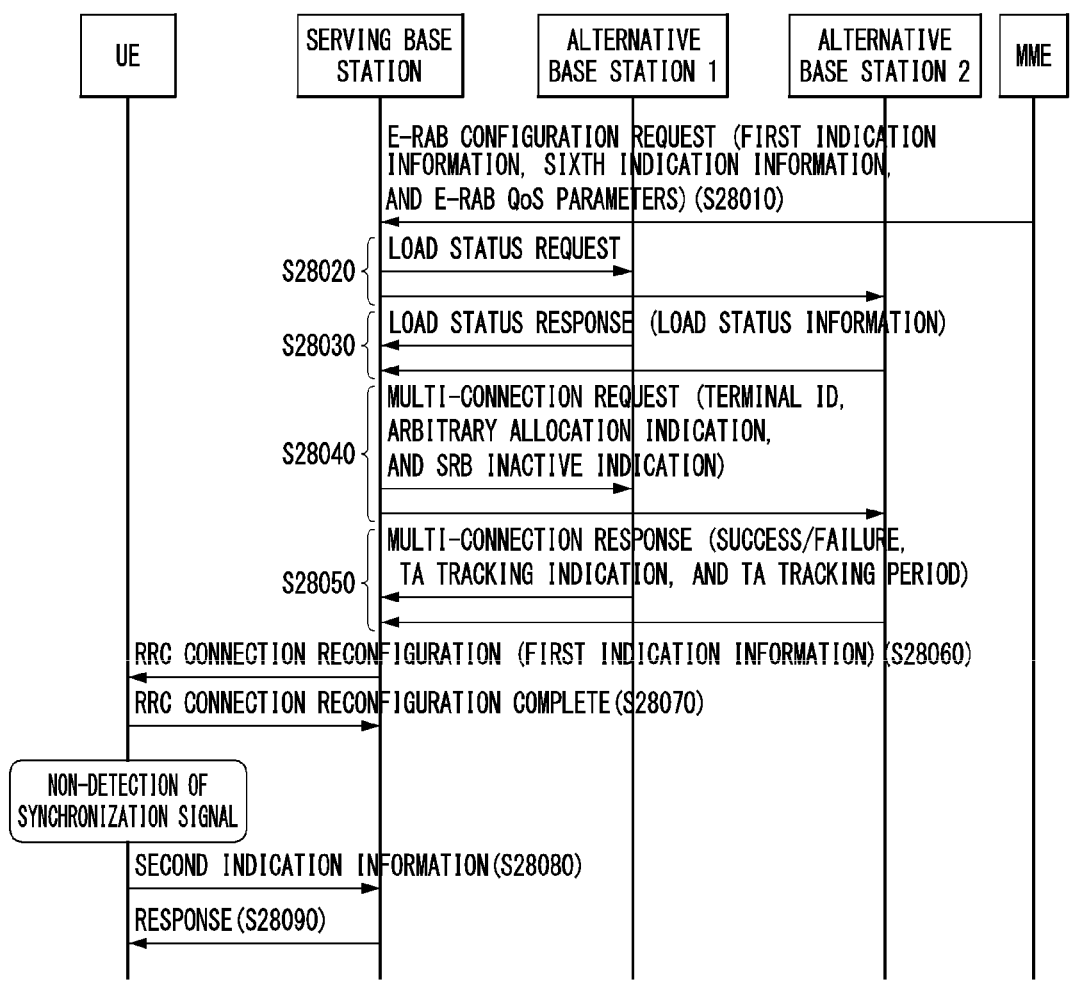
FIG. 28 is a flowchart illustrating an example of a method for dividing a measurement gap in the case of network indication based multiple connections proposed by the present specification.

FIG. 28 is a flowchart illustrating an example of a method for dividing a measurement gap in the case of network indication based multiple connections proposed by the present specification.

Referring to FIG. 28, in the method for performing the network indication based multi-connection among the methods for configuring the multiple connections described above, the MCS data may be transmitted and received by shortening the measurement gap through the method described in FIG. 21.

Specifically, the serving base station transmits a broadcast message including control information related to the mission critical service (MCS) to the terminal.

The broadcast message may be a system information block (SIB), a master information block (MIB), or the like.

Control information related to the MCS may include a radio link quality degradation (RLQD) threshold, information on a maximum number of alternative links indicating the maximum number of alternative links that may be configured by the terminal, and the like.

The RLQD threshold as a minimum value of the radio link quality for receiving the MCS is a reference value for determining whether the quality of the radio link (signal) is deteriorated so as to receive the MCS through the corresponding radio link.

Therefore, when the radio link quality of the serving base station is lower than the RLQD threshold, the terminal attempts connection with another radio link.

The radio link (signal) quality may be measured by using the RSRP, the RSRQ, the RSSI, the SINR, and the like described above.

The information on the maximum number of alternative links is information indicating the maximum number of alternative links which the terminal may configure with the alternative base station for a specific service such as the MCS or the like.

Next, the terminal measures the radio link quality for each alternative base station based on the list of the alternative base stations (or neighbor base stations and candidate base stations) possessed thereby and reports the measurement result to the serving base station.

Thereafter, the network node (for example, MME) transmits an E-RAB setup request message including indication information (first indication information) indicating shortening/division of the predetermined measurement gap for transmitting and receiving the MCS data to the serving base station and indication information (sixth indication information) indicating the multi-link (alternatively, multi-connection) setup (step S28010).

The E-RAB setup request message may include E-RAB QoS parameters related to MCS in addition to the first indication information and the sixth indication information.

The sixth indication information indicates an indicator for indicating the multi-link (alternatively, alternative link) setting between the terminal and at least one alternative base station.

One of the E-RAB QoS parameters may be a QoS class identifier (QCI) of the MCS and the E-RAB QoS parameters may be included in an E-RAB QoS Parameters information element (IE).

That is, the serving base station may know which service (a service of which QoS) a service related to the MCS bearer setup is (with which QoS the service is a service) through the received E-RAB QoS parameter.

Accordingly, the serving base station may configure the data ratio bearer (DRB) for a service having a specific QoS with the terminal.

In summary, when the MCS needs to be provided to a specific terminal, the network node informs the serving base station of the MCS bearer through the S1 signaling.

Accordingly, the serving base station may configure the DRB for the MCS with the terminal and indicate to configure the multi-connection or the alternative link for the terminal as necessary.

The serving base station transmits a load status request message to at least one base station (alternative base stations 1 and 2) to request information on the load statuses of the alternative candidate base stations (S28020).

Thereafter, the serving base station receives a load status response message including load status information indicating the load status of each of the alternative base stations in response to the load status request message from the at least one alternative base station (S28030).

The load status may indicate either high, medium, or low according to the load status of each of the alternative base stations.

The serving base station that confirms the load status of the at least alternative base station through the load status response message transmits a multi-link connection request message for requesting the multi-connection to the at least one alternative base station (S28040).

Representation of the multi-connection request message as an example may be referred to as various terms including a multi-link connection request message, an alternative link securing request message, and the like.

The multi-connection request message may include a terminal identifier (e.g., UE ID, etc.), context information of the terminal, signaling radio bearer (SRB) deactivate indication information (fifth indication information), and the like.

The context information of the terminal refers to context information of the terminal used for managing the terminal in the network, that is, UE ID, mobility (current location, etc.), session attributes (QoS, priority, etc.).

The SRB deactivate indication information indicates an indicator for indicating the SRB state of the alternative link configured with the alternative base station to be configured as deactive (or event-triggered dormant mode).

Thereafter, the serving base station receives the multi-link connection response message in response to the multi-link connection request message from the at least one alternative base station (S28050).

The multi-link connection response message may also be referred to as another term as described in the multi-link connection request message.

In addition, the multi-link connection response message includes information on the at least one alternative base station.

That is, the multi-link connection response message may include the C-RNTI allocated to the terminal by the at least one alternative base station, the result (success/failure) information for the multi-connection request, TA tracking for acquiring synchronization between the terminal and the alternative base station, TA tracking period information, and the like.

The TA tracking indication information and the TA tracking period information correspond to information required for acquiring the synchronization when the terminal and the alternative base station does not synchronize with each other with the movement of the terminal.

The base station configures a matter related with the multi-connection setup, that is, the alternative link with the at least one alternative base station (alternative base stations 1 and 2) and transmits the RRC connection reconfiguration message to the terminal in order to inform of performing the measurement by shortening the predetermined measurement gap when the MCS data is transmitted (S28060).

The RRC connection reconfiguration message may include information received from the at least one alternative base station, the first indication information, and the like.

In this case, when the terminal detects the synchronization signal in the specific gap (the first gap) and may not detect the synchronization signal in the specific gap among the divided gaps through the first indication information, the terminal may request to change the gap for measurement of the adjacent cell to another gap divided in the specific gap.

The terminal transmits an RRC connection reconfiguration complete message for informing that the multi-connection setup for the at least one alternative base station (alternative base stations 1 and 2) is completed to the serving base station (S28070).

The terminal that receives the first indication information may recognize that the measurement may be performed by shortening the predetermined measurement gap. That is, it may be recognized that the predetermined measurement gap is divided to perform the measurement only in a specific gap and other gaps may be used for transmitting and receiving the MCS data.

The terminal divides the measurement gap into the first gap and the second gap and performs the measurement in the first gap. As a result of the measurement, when the synchronization signal (e.g., the primary synchronization signal (PSS)) is detected in the first section, the MCS data may be transmitted and received without performing the measurement in the second gap.

However, when the synchronization signal is not detected in the first gap, the terminal transmits to the base station indication information (second indication information) indicating that the synchronization signal is not detected in the first gap (S28080).

In this case, the terminal may request the base station to use the gap in which the synchronization signal is detected, that is, the second gap as the gap for measurement of the adjacent cell through the second indication information.

When receiving the second indication information, the base station may know that the synchronization signal is not detected in the first gap and that the terminal will perform the measurement in the second gap and transmit ACK to the terminal in response thereto (S28090).

However, when the second indication information is not received, the base station may know that the synchronization signal is detected in the first gap and thereafter, the terminal will perform the measurement in the first gap.

Thereafter, the base station may transmit the MCS data transmitted from the S-GW to the terminal in a specific gap (the first gap or the second gap) in which the synchronization signal is not detected.

Even when the MCS data is generated in a predetermined measurement gap through such a method, the MCS data may be transmitted by shortening the predetermined measurement gap.

In the present invention, dividing the predetermined measurement gap into two is exemplified, but there may be an embodiment in which the predetermined measurement gap is divided into three or more.

Figure 29:
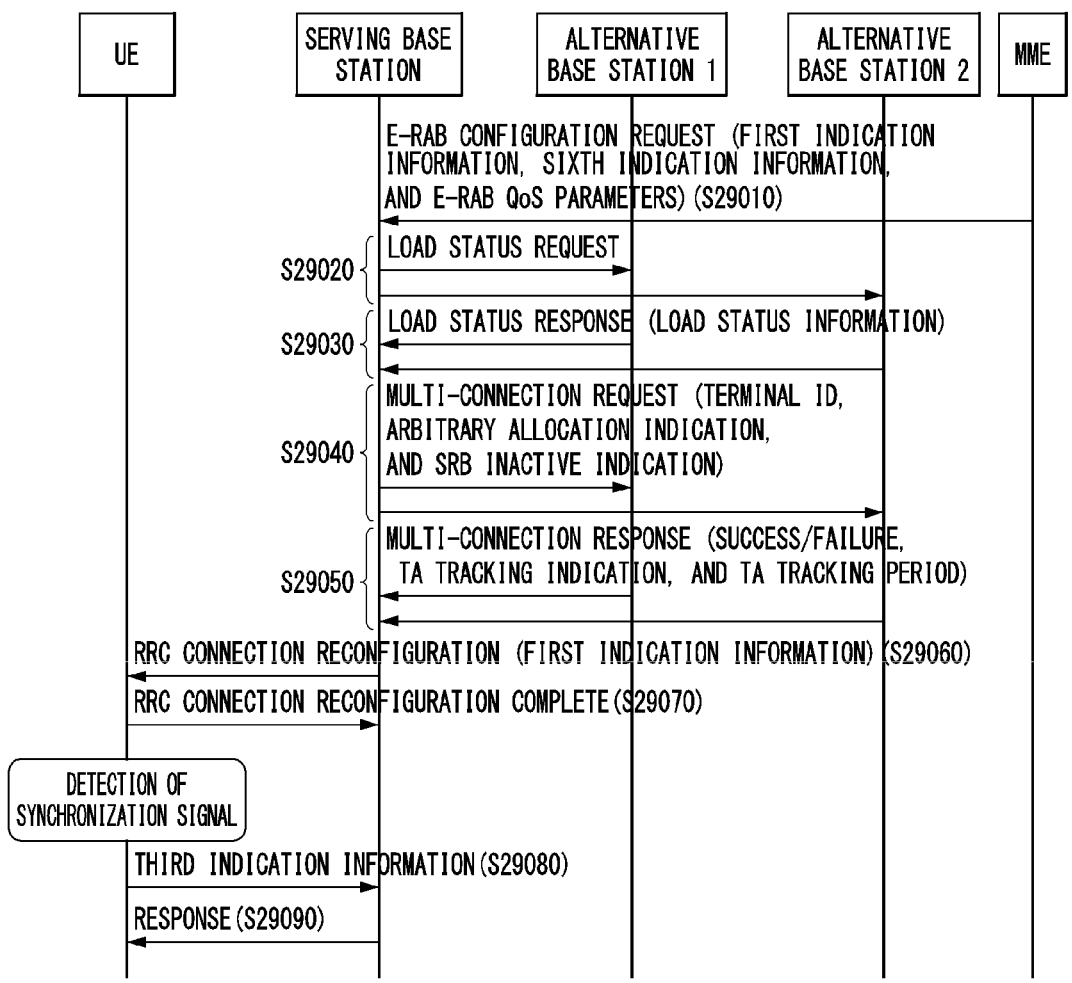
FIG. 29 is a flowchart illustrating another example of a method for dividing a measurement gap in the case of network indication based multiple connections proposed by the present specification.

FIG. 29 is a flowchart illustrating another example of a method for dividing a measurement gap in the case of network indication based multiple connections proposed by the present specification.

Referring to FIG. 29, unlike FIG. 28, the MCS data may be transmitted and received by shortening the predetermined measurement gap through the method described in FIG. 22. That is, the measurement is performed in a predetermined measurement gap before the division, and it is determined in which gap after the division the synchronization signal is to be detected and the MCS data may be transmitted and received in the gap in which the synchronization signal is not detected.

First, since steps S29010 to S29070 are the same as steps S28010 and S28070 of FIG. 28, the description thereof will be omitted.

In this case, unlike FIG. 28, the terminal may request checking the gap in which the synchronization signal is detected and configuring the gap in which the synchronization signal is detected as the gap for measurement of the adjacent cell among the divided measurement gaps to the terminal through the first indication information.

The terminal that receives the first indication information may recognize that the measurement may be performed by shortening the predetermined measurement gap. That is, it may be recognized that the predetermined measurement gap is divided to perform the measurement only in a specific gap and other gaps may be used for transmitting and receiving the MCS data.

However, since the terminal receives the first indication information, but may not know in which gap the synchronization signal is to be detected, the terminal detects the synchronization signal in all measurement gaps.

That is, the terminal detects the synchronization signal in both the first and second gaps.

Thereafter, the terminal transmits indication information including positional information indicating in which gap of the first and second gaps the synchronization signal (for example, the primary synchronization signal (PSS)) is measured to the serving base station (S29080).

In this case, the terminal may request the base station to use the gap in which the synchronization signal is detected, that is, the second gap as the gap for measurement of the adjacent cell through the third indication information.

The base station may transmit the ACK to the terminal in response to the third indication information (S29090).

Thereafter, the base station may transmit the MCS data transmitted from the S-GW to the terminal in a specific gap (the first gap or the second gap) in which the synchronization signal is not detected.

Even when the MCS data is generated in a predetermined measurement gap through such a method, the MCS data may be transmitted by shortening the predetermined measurement gap.

In the present invention, dividing the predetermined measurement gap into two is exemplified, but there may be an embodiment in which the predetermined measurement gap is divided into three or more.

Figure 30:
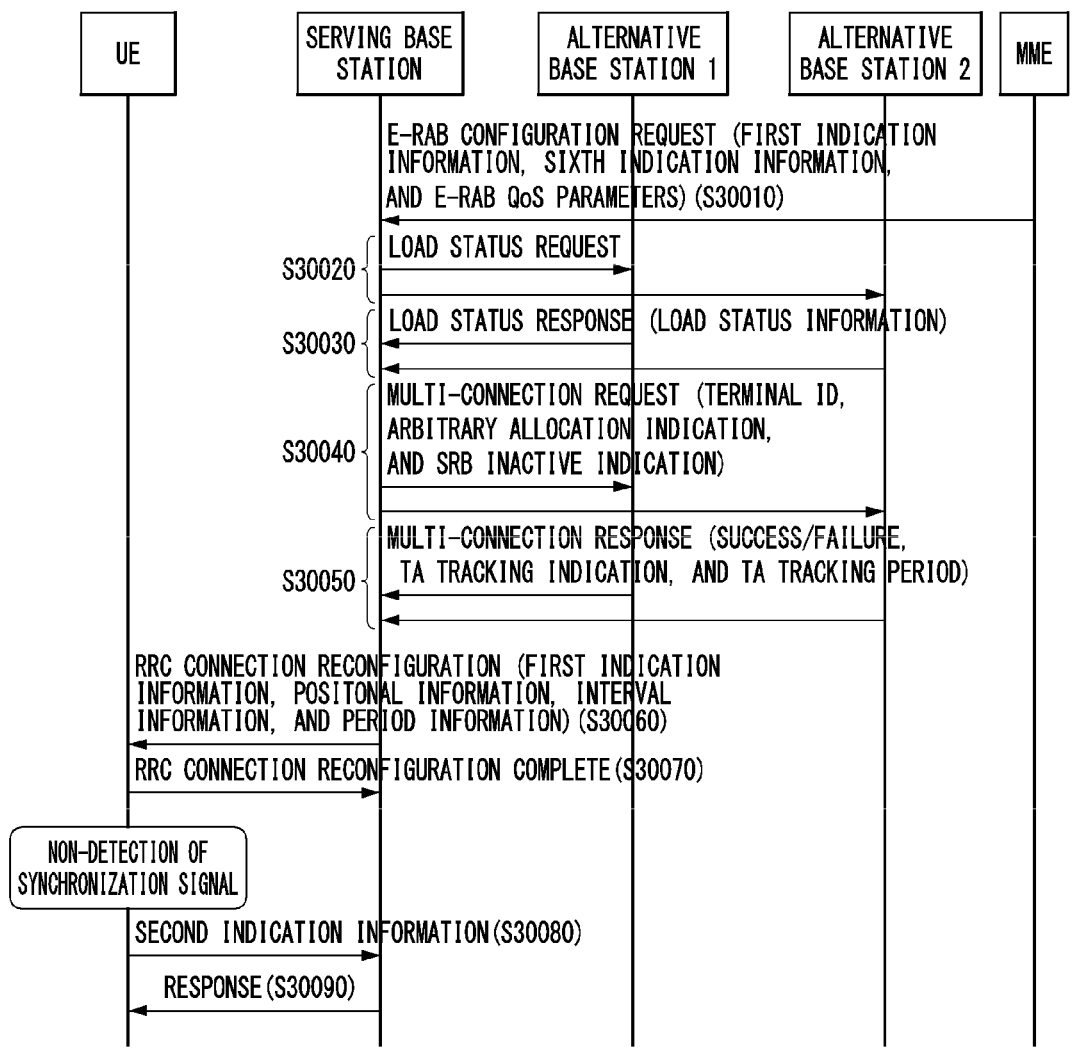
FIG. 30 is a flowchart illustrating an example of a method for setting divided measurement gaps in the case of network indication based multiple connections proposed by the present specification.

FIG. 30 is a flowchart illustrating an example of a method for setting divided measurement sections in the case of network indication based multiple connections proposed by the present specification.

Referring to FIG. 30, when dividing the preset measurement interval described in FIG. 28 or 29 into two, information related to the divided measurement gaps, for example, positions of the first gap and the second gap, an interval between the first and second gaps, a period between the first and second gaps, and the like may be configured.

First, since steps S30010 to S30050 are the same as steps S28010 and S28050 of FIG. 28, the description thereof will be omitted.

The multi-connection response message of step S30050 may include information on the at least one alternative base station (alternative base stations 1 and 2).

That is, the multi-connection setup complete message may include the C-RNTI allocated to the terminal by the at least one alternative base station (alternative base stations 1 and 2), the result (success/failure) for the multi-connection setup, TA tracking indication information and TA tracking period information for acquiring the synchronization between the terminal and the alternative base station, and the like.

The TA tracking indication information and the TA tracking period information correspond to information required for acquiring the synchronization when the terminal and the alternative base station does not synchronize with each other with the movement of the terminal.

The base station configures a matter related with the multi-connection setup, that is, the alternative link with the at least one alternative base station (alternative base stations 1 and 2) and transmits the RRC connection reconfiguration message to the terminal in order to inform of performing the measurement by shortening the predetermined measurement gap when the MCS data is transmitted (S30060).

The RRC connection reconfiguration message may include information received from the at least one alternative base station, the first indication information, and the like.

In this case, when the terminal detects the synchronization signal in the specific gap (the first gap) and may not detect the synchronization signal in the specific gap among the divided gaps through the first indication information, the terminal may request to change the gap for measurement of the adjacent cell to another gap divided in the specific gap.

In addition, the RRC connection reconfiguration message may further include configuration information for configuring the divided measurement gaps when the predetermined measurement gap is divided.

The configuration information may include positional information for configuring the positions of the divided measurement gaps, gap information for configuring the interval between the divided measurement gaps, and period information for configuring the period of the divided measurement gaps.

The positions, the interval, and the period of the divided gaps may be configured through the configuration information. For example, when the measurement gap is divided into the first gap and the second gap, the first gap may be constituted by three (or four) subframes and the second gap may be constituted by four (or three) subframes of system frame numbers (SFNs) that are far away from the first gap according to the period and the interval of the measurement gap included in the configuration information.

The terminal transmits an RRC connection reconfiguration complete message for informing that the multi-connection setup for the at least one alternative base station (alternative base stations 1 and 2) is completed to the serving base station (S30070).

The terminal that receives the first indication information and the configuration information may recognize that the measurement may be performed by shortening the predetermined measurement gap. That is, it may be recognized that the predetermined measurement gap is divided to perform the measurement only in a specific gap and other gaps may be used for transmitting and receiving the MCS data.

The terminal that receives the configuration information may divide the predetermined measurement gap and configure the divided measurement gaps according to the configuration information.

As described above, FIGS. 26 and 27 illustrate an example of configuring the first gap and the second gap when the predetermined measurement gap is divided into two, that is, when the predetermined measurement gap is divided into the first gap and the second gap according to the configuration information.

Thereafter, the terminal performs the measurement in the first gap. As a result of the measurement, when the synchronization signal (e.g., the primary synchronization signal (PSS)) is detected in the first section, the MCS data may be transmitted and received without performing the measurement in the second gap.

However, when the synchronization signal is not detected in the first gap, the terminal transmits to the base station indication information (second indication information) indicating that the synchronization signal is not detected in the first gap (S30080).

In this case, the terminal may request the base station to use the gap in which the synchronization signal is detected, that is, the second gap as the gap for measurement of the adjacent cell through the second indication information.

When receiving the second indication information, the base station may know that the synchronization signal is not detected in the first gap and that the terminal will perform the measurement in the second gap and transmit ACK to the terminal in response thereto (S30090).

However, when the second indication information is not received, the base station may know that the synchronization signal is detected in the first gap and thereafter, the terminal will perform the measurement in the first gap.

Thereafter, the base station may transmit the MCS data transmitted from the S-GW to the terminal in a specific gap (the first gap or the second gap) in which the synchronization signal is not detected.

Even when the MCS data is generated in the predetermined measurement gap, it is possible to transmit the MCS data by shortening and applying the predetermined measurement gap and to avoid a situation in which the synchronization signal may not be detected by configuring the interval, the positions, and the period of the divided measurement gaps.

In the present invention, dividing the predetermined measurement gap into two is exemplified, but there may be an embodiment in which the predetermined measurement gap is divided into three or more.

Figure 31:
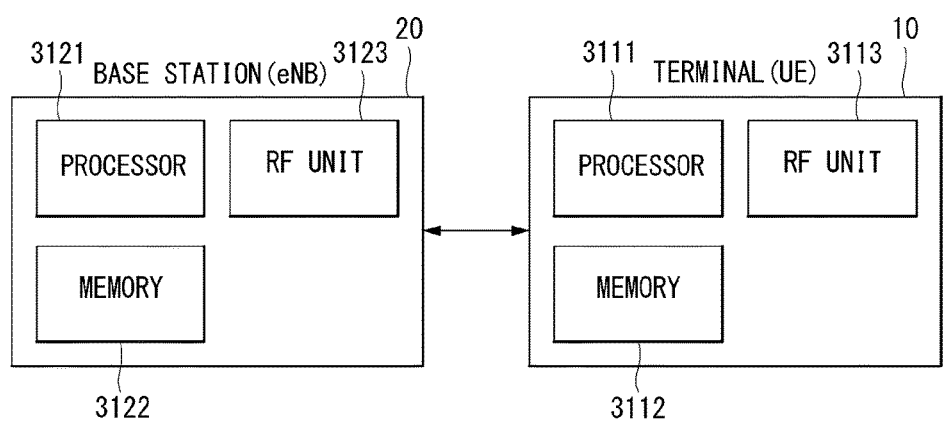
FIG. 31 is a block diagram illustrating an example of a wireless apparatus in which the methods proposed by the present specification may be implemented.

FIG. 31 is a block diagram illustrating an example of a wireless apparatus in which the methods proposed by the present specification may be implemented.

Herein, the wireless apparatus may be a network entity, a base station, a terminal, or the like and the base station includes both a macro base station and a small base station.

As illustrated in FIG. 31, the terminal 10 and the base station 20 include processors 3111 and 3121, memories 3112, and 3122, and RF units (a transceiving unit and a communication unit) 3113 and 3123.

Besides, the base station and the terminal may further include an input unit and an output unit.

The RF units 3113 and 3123, the processors 3111 and 3121, an input unit, an output unit, and the memories 3112 and 3122 are functionally connected to perform the method proposed in the present specification.

The RF units 3113 and 3123 receive information generated from a PHY protocol layer, move the received information to a radio-frequency (RF) spectrum, and performs filtering, amplification, and the like and transmits the information to an antenna. Further the communication unit performs a function to move a radio frequency RF) signal received by the antenna to a band that may be processed by a PHY protocol and perform filtering.

In addition, the communication unit may also include a switch function for switching transmission and reception functions.

The processors 3111 and 3121 implement a function, a process, and/or a method which are proposed in the present specification. Layers of a radio interface protocol may be implemented by the processor.

The processor may be expressed as a control section, a controller, a control unit, a computer, and the like.

The memories 3112 and 3122 are connected with the processor to store a protocol or a parameter for performing the method proposed by the present specification.

The processors 3111 and 3121 may include an application-specific integrated circuit (ASIC), another chipset, a logic circuit, and/or a data processing apparatus. The memory may include a read-only memory (ROM), a random access memory (RAM), a flash memory, a memory card, a storage medium, and/or other storage devices. The communication unit may include a baseband circuit for processing the radio signal. When the embodiment is implemented by software, the aforementioned technique may be implemented by a module (a process, a function, and the like) that performs the aforementioned function.

The module may be stored in the memory and executed by the processor. The memory may be positioned inside or outside the processor and connected with the processor by various well-known means.

An output unit (display section or display unit) is controlled by the processor, and outputs information output from the processor together with a key input signal generated by a key input unit various information signals from the processor.

Furthermore, although the drawings have been described for the sake of convenience of explanation, it is also possible to design a new embodiment to be implemented by merging the embodiments described in each drawing. It is also within the scope of the present invention to design a computer-readable recording medium in which a program for executing the previously described embodiments is recorded according to the needs of those skilled in the art.

Configurations and methods of the described embodiments may not be limitedly applied to the method proposed by the present specification, but all or some of the respective embodiments may be selectively combined and configured so as to be variously modified.

Meanwhile, the method proposed by the present specification may be implemented as a processor readable code in a processor readable recording medium provided in a network device. The processor readable recording medium includes all kinds of recording devices storing data which may be deciphered by a processor. Examples of the processor readable recording medium include a ROM, a RAM, a CD-ROM, a magnetic tape, a floppy disk, an optical data storage device, and the like and further include a device implemented as a type of a carrier wave such as transmission through the Internet.

Further, the processor readable recording media may be stored and executed as codes which may be distributed in the computer system connected through a network and read by the processor in a distribution method.

The aforementioned present invention is not limited to the aforementioned embodiments and the accompanying drawings, and it will be obvious to those skilled in the technical field to which the present invention pertains that various substitutions, modifications, and changes may be made within the scope without departing from the technical spirit of the present invention.

INDUSTRIAL APPLICABILITY

An example in which in the wireless communication system of the present invention, the RRC connection method is applied to the 3GPP LTE/LTE-A system is described primarily, but it is possible to apply the RRC connection method to various wireless communication systems in addition to the 3GPP LTE/LTE-A system.

The invention claimed is:

1. A method for transmitting and receiving data by a base station in a wireless communication system, the method comprising:
receiving, from a terminal, fourth indication information indicating whether the terminal can provide a mission critical service (MCS);
transmitting the fourth indication information to a network node;
receiving, from the network node, first indication information indicating division of a measurement gap indicating a gap for performing measurement on a non-serving frequency;
transmitting the first indication information to the terminal; and
receiving MCS data in at least one divided measurement gap, during which no synchronization signal is detected, among divided measurement gaps.

2. The method of claim 1, further comprising:
receiving second indication information indicating that the synchronization signal is not detected in a specific gap among the divided measurement gaps.

3. The method of claim 1, further comprising:
receiving third indication information indicating that the synchronization signal is detected in a specific gap among the divided measurement gaps.

4. The method of claim 3, wherein the third indication information further includes positional information indicating a position of the specific gap.

5. The method of claim 1, wherein the measurement gap is divided into two or three gaps.

6. The method of claim 5, wherein when the measurement gap is divided into a first gap and a second gap, the first gap is constituted by four subframes and the second gap is constituted by three subframes of subsequent system frame numbers (SFNs) of the first gap.

7. The method of claim 5, wherein when the measurement gap is divided into a first gap and a second gap, the first gap is constituted by four subframes and the second gap is constituted by four subframes of subsequent system frame numbers (SFNs) of the first gap.

8. The method of claim 1, further comprising:
transmitting, to the terminal, configuration information including at least one of positional information indicating the positions of the divided measurement gaps, interval information indicating an interval of the divided measurement gaps, or period information indicating a period of the divided measurement gaps.

9. The method of claim 8, further comprising:
transmitting a radio resource control (RRC) connection reconfiguration message to the terminal; and
receiving an RRC connection reconfiguration complete message in response to the RRC connection reconfiguration message,
wherein the RRC connection reconfiguration message includes at least one of the first indication information or the configuration information.

10. The method of claim 1, wherein the fourth indication information is included in an initial user equipment (UE) message and transmitted to the network node.

11. The method of claim 1, further comprising:
transmitting a request message for configuring an alternative link to at least one alternative base station; and
receiving a response message including load status information indicating a load status of the at least one alternative base station from the at least one alternative base station,
wherein in the alternative link, a signaling radio bearer (SRB) is in an inactive state.

12. The method of claim 11, further comprising:
receiving a radio resource control (RRC) connection request message from the terminal;
transmitting an RRC connection setup message including at least one of an ID of the base station or a cell-radio network temporary identifier (C-RNTI) to the terminal; and
receiving an RRC connection setup complete message in response to the RRC connection setup message,
wherein the RRC connection request message includes at least of the fourth indication information, a cause field indicating the RRC connection request for the MCS, or list information of the at least one alternative base station.

13. The method of claim 12, further comprising:
transmitting an alternative link setup message to the at least one alternative base station; and
receiving an alternative link setup complete message in response to the alternative link setup message,
wherein the alternative link setup message includes at least one of a user equipment (UE) ID indicating the UE, context information of the UE, or fifth indication information indicating deactivation of the alternative link.

14. The method of claim 1, further comprising:
receiving an initial context setup request message from the network node; and
receiving an initial context setup response message in response to the initial context setup request message,
wherein the initial context setup request message includes at least one of the first indication information, an E-UTRAN radio access bearer (E-RAB) ID, an E-RAB, quality of service (QoS), eNB key (KeNB), or a security algorithm.

15. A method for transmitting and receiving data by a base station in a wireless communication system, the method comprising:
receiving an E-RAB configuration request message for requesting configuration of an E-UTRAN radio access bearer (E-RAB) for a mission critical service (MCS) from a network node,
wherein the E-RAB configuration request message including at least one of sixth indication information indication alternative link configuration between a terminal and at least one alternative base station or first indication information indicating division application of a measurement gap indicating a gap in which measurement for a non-serving frequency is performed from the network node;
configuring an alternative link between the terminal and the at least one alternative base station based on the received E-RAB configuration request message;
transmitting the first indication information to the terminal; and
receiving MCS data in at least one divided measurement gap, during which no synchronization signal is detected, among divided measurement gaps.

16. The method of claim 15, further comprising:
receiving second indication information indicating that the synchronization signal is not detected in a specific gap among the divided measurement gaps.

17. The method of claim 15, further comprising:
receiving third indication information indicating that the synchronization signal is detected in a specific gap among the divided measurement gaps.

18. The method of claim 17, wherein the third indication information further includes positional information indicating a position of the specific gap.

19. The method of claim 15, further comprising:
transmitting, to the terminal, configuration information including at least one of positional information indicating the positions of the divided measurement gaps, interval information indicating an interval of the divided measurement gaps, or period information indicating a period of the divided measurement gaps.

* * * * *